(12) United States Patent
Wei et al.

(10) Patent No.: US 12,556,752 B2
(45) Date of Patent: Feb. 17, 2026

(54) DATA TRANSMISSION ENCRYPTION CONTROL METHOD AND APPARATUS

(71) Applicant: Huawei Technologies Co., Ltd., Shenzhen (CN)

(72) Inventors: Zhigui Wei, Shenzhen (CN); Zhijian Liang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 197 days.

(21) Appl. No.: 18/472,310

(22) Filed: Sep. 22, 2023

(65) Prior Publication Data

US 2024/0015142 A1    Jan. 11, 2024

Related U.S. Application Data

(63) Continuation of application No. PCT/CN2021/083095, filed on Mar. 25, 2021.

(51) Int. Cl.
    *H04N 21/2347*     (2011.01)
    *H04L 9/40*     (2022.01)

(52) U.S. Cl.
    CPC ..... *H04N 21/2347* (2013.01); *H04L 63/0435* (2013.01)

(58) Field of Classification Search
    CPC .................................................. H04N 21/2347
    See application file for complete search history.

(56) References Cited

U.S. PATENT DOCUMENTS

| | | | |
|---|---|---|---|
| 9,654,810 B2 * | 5/2017 | Altmann | H04N 21/23476 |
| 10,154,014 B2 * | 12/2018 | Zhang | H04N 21/6437 |
| 2009/0327691 A1 | 12/2009 | Kishore et al. | |

FOREIGN PATENT DOCUMENTS

| | | |
|---|---|---|
| CA | 2369118 A1 | 10/2000 |
| CN | 112235607 A | 1/2021 |
| WO | 2016015222 A1 | 2/2016 |

OTHER PUBLICATIONS

CEA-861-D: "A DTV Profile for Uncompressed High Speed Digital Interfaces." Jul. 2006. total 176 pages.

\* cited by examiner

*Primary Examiner* — Mulugeta Mengesha
(74) *Attorney, Agent, or Firm* — Slater Matsil, LLP

(57) ABSTRACT

This application discloses a data transmission encryption control method and apparatus, and relates to the field of media technologies. The method includes: determining that a to-be-transmitted data packet includes an encryption identifier indicating that the to-be-transmitted data packet is transmitted in an encrypted transmission mode, and encrypting the to-be-transmitted data packet. The to-be-transmitted data packet includes a video data packet. The video data packet is a video data packet obtained based on any line of video data in image frame data of the to-be-transmitted video.

20 Claims, 10 Drawing Sheets

DATA TRANSMISSION ENCRYPTION CONTROL METHOD AND APPARATUS

CROSS-REFERENCE TO RELATED APPLICATIONS

This application is a continuation of International Application No. PCT/CN2021/083095, filed on Mar. 25, 2021, the disclosure of which is hereby incorporated by reference in its entirety.

TECHNICAL FIELD

This application relates to the field of media technologies, and in particular, to a data transmission encryption control method and apparatus.

BACKGROUND

With the development of high definition video technologies, security of data content becomes increasingly important.

For mainstream media interfaces (including a high-definition multimedia interface (HDMI) and a DisplayPort (DP)), a high bandwidth digital content protection (HDCP) technology is usually used to perform encryption protection on data content of a transmitted video.

However, in conventional technologies, when the encryption protection is performed on the data of the transmitted video, an encryption granularity of the data is usually large. As a result, some data that does not need to be encrypted (for example, control-type data of a video or data that is not required to be encrypted) is also encrypted, thereby increasing system power consumption of a data transmission device.

SUMMARY

This application provides a data transmission encryption control method and apparatus. The method may implement fine-grained control of encrypted transmission of data in a to-be-transmitted video, so that data that does not need to be encrypted is not encrypted for transmission. In this way, an unnecessary encryption operation is avoided for a data transmission apparatus, and system power consumption of the data transmission apparatus is reduced.

To achieve the foregoing objective, this application provides the following technical solutions.

According to a first aspect, this application provides a data transmission encryption control method. The method includes: determining that a to-be-transmitted data packet includes an encryption identifier indicating that the to-be-transmitted data packet is transmitted in an encrypted transmission mode, and encrypting the to-be-transmitted data packet. Then, the encrypted to-be-transmitted data packet may be transmitted to a data receive end. The to-be-transmitted data packet includes a video data packet obtained based on a first line of video data. The first line of video data is any line of video data in image frame data of the to-be-transmitted video.

It can be learned that encrypted transmission of a data packet can be implemented according to the method provided in this application. Therefore, data content in a data packet is protected in a transmission process. The video data packet is obtained based on one line of video data, that is, a size of video data in the video data packet is less than or equal to that of the line of video data. In other words, an encryption granularity of the video data in the method provided in this application is less than or equal to the line of video data. Compared with an encryption granularity of a DP interface and an encryption granularity of an HDMI interface, the encryption granularity of the video data during video transmission is reduced in the method in this application.

Because the encryption granularity is a video data packet, according to the method provided in this application, some video data packets in the to-be-transmitted video may be encrypted for transmission, and other video data packets are not encrypted for transmission. In this way, according to the method, encrypted transmission may be performed on a video data packet that needs content protection, and encrypted transmission may be not performed on a video data packet that does not need content protection, so that encrypted transmission of video data is more flexible. In this way, compared with system power consumption caused by an encryption operation when the video data that does not need to be encrypted is also encrypted due to a large encryption granularity, system power consumption may be reduced by using this application.

In a possible design manner, the to-be-transmitted data packet further includes an auxiliary data packet obtained based on auxiliary data of the to-be-transmitted video, and the auxiliary data is data other than the image frame data in the to-be-transmitted video.

In this possible design, according to the method in this application, the auxiliary data may also be encrypted at a granularity of the auxiliary data packet, to implement encrypted transmission of the auxiliary data.

In another possible design manner, the encryption identifier further indicates a data type of data in the to-be-transmitted data packet, and the data type includes the image frame data and the auxiliary data.

For example, if the data in the to-be-transmitted data packet is the image frame data, the encryption identifier may be represented by using an active video protection start identifier and an active video protection end identifier. If the data in the to-be-transmitted data packet is the auxiliary data, the encryption identifier may be represented by using an auxiliary data protection start identifier and an auxiliary data protection end identifier.

In this possible design, according to the method in this application, the data type in the to-be-transmitted data packet may be identified based on the encryption identifier. In this way, different data has different encryption identifiers. At the data receive end, a type of data in a received data packet may be determined based on the different encryption identifiers, to correctly process the received data packet, thereby ensuring user experience.

In another possible design manner, before the determining that a to-be-transmitted data packet includes an encryption identifier indicating that the to-be-transmitted data packet is transmitted in an encrypted transmission mode, the method further includes: inserting the encryption identifier or a type identifier into the to-be-transmitted data packet based on data content in the to-be-transmitted data packet, and inserting the encryption identifier into the to-be-transmitted data packet when it is determined that the data in the to-be-transmitted data packet is data that needs to be encrypted. The type identifier indicates the data type of the data in the to-be-transmitted data packet. The data type includes the image frame data and the auxiliary data.

In this possible design manner, the encryption identifier may be inserted into a data packet that needs to be encrypted, and a data type of a data packet that does not need to be encrypted is indicated by using only the type identifier. In this way, the data receive end may perform corresponding processing on the currently received data packet based on whether an identifier in the data packet is the encryption identifier or the type identifier, to ensure that the received data packet is correctly processed, thereby ensuring user experience.

In another possible design manner, the auxiliary data includes content data, and the content data includes at least one of audio data, subtitle data, bullet comment data, or logo data. The inserting the encryption identifier or a type identifier into the to-be-transmitted data packet based on data content in the to-be-transmitted data packet includes: inserting the encryption identifier into the to-be-transmitted data packet if the data in the to-be-transmitted data packet is content data. In this way, in subsequent processing, the to-be-transmitted data packet may be first encrypted and then transmitted.

In another possible design manner, the auxiliary data further includes control data. The control data includes at least one of audio rendering data, image frame rendering data in the to-be-transmitted video, remote control data, or special effect data. The remote control data is used to remotely operate the image frame. The inserting the encryption identifier or a type identifier into the to-be-transmitted data packet based on data content in the to-be-transmitted data packet includes: inserting the type identifier into the to-be-transmitted data packet if the data in the to-be-transmitted data packet is the control data, where the type identifier indicates that the data in the to-be-transmitted data packet is the control data. In this way, in subsequent processing, the to-be-transmitted data packet can be transparently transmitted. In other words, the data packet is directly transmitted without being encrypted.

In the two possible design manners, encrypted transmission may be performed on data with actual content, and control-type data may be transmitted in a transparent transmission mode. In this way, the following problem can be avoided: When the control-type data is encrypted for transmission, if an exception occurs in a transmission process, a decryption exception may occur when the control-type data is decrypted at the receive end. If the decryption exception occurs for the control data, the transmitted video cannot be normally rendered and displayed/played, thereby reducing user experience. It can be easily learned that this problem can be avoided by using the method in this application, thereby improving user experience. In addition, according to the method in this application, data that does not need content protection is not encrypted for transmission, thereby avoiding an unnecessary encryption operation and reducing system power consumption.

In another possible design manner, the inserting the encryption identifier or a type identifier into the to-be-transmitted data packet based on data content in the to-be-transmitted data packet includes: inserting the encryption identifier into the to-be-transmitted data packet if the data in the to-be-transmitted data packet corresponds to an image in a preset region in a first image frame. In this way, in subsequent processing, the to-be-transmitted data packet may be first encrypted and then transmitted. The first image frame is any image frame of the to-be-transmitted video.

In another possible design manner, the inserting the encryption identifier or a type identifier into the to-be-transmitted data packet based on data content in the to-be-transmitted data packet includes: inserting the type identifier into the to-be-transmitted data packet if the data in the to-be-transmitted data packet corresponds to an image outside the preset region in the first image frame, where the type identifier indicates that the data in the to-be-transmitted data packet is video data. In this way, in subsequent processing, the to-be-transmitted data packet can be transparently transmitted. In other words, the to-be-transmitted data packet is directly transmitted without being encrypted.

In the two possible implementations, according to the method in this application, encrypted transmission can be implemented for video data corresponding to a picture in some regions in the video. In this way, this part of the video data is protected in the transmission process. However, video data corresponding to a picture outside these regions in the video is transparently transmitted. In this manner, the video content of the to-be-transmitted video can be flexibly partially encrypted for transmission, thereby improving user experience. In addition, according to the method in this application, data that does not need content protection is not encrypted for transmission, thereby avoiding an unnecessary encryption operation and reducing system power consumption.

According to a second aspect, this application provides a data transmission encryption control method, including: determining that a to-be-transmitted video data packet includes a first encryption identifier indicating that the to-be-transmitted video data packet is transmitted in an encrypted transmission mode, and encrypting the to-be-transmitted video data packet. Then, the encrypted to-be-transmitted video data packet may be transmitted to a data receive end.

The to-be-transmitted video data packet is any one of at least one video data packet obtained based on a first line of video data. The first line of video data is any line of video data in image frame data of the to-be-transmitted video. For example, the first encryption identifier may be represented by using an active video protection start identifier and an active video protection end identifier.

In a possible design manner, the method further includes: determining that a to-be-transmitted auxiliary data packet includes a second encryption identifier indicating that the to-be-transmitted auxiliary data packet is transmitted in the encrypted transmission mode, and encrypting the to-be-transmitted auxiliary data packet. Then, the encrypted to-be-transmitted auxiliary data packet may be transmitted to the data receive end.

The to-be-transmitted auxiliary data packet is any one of a plurality of auxiliary data packets obtained based on auxiliary data of the to-be-transmitted video, and the auxiliary data is data other than the image frame data in the to-be-transmitted video. For example, the second encryption identifier may be represented by using an auxiliary data protection start identifier and an auxiliary data protection end identifier.

It should be understood that, for beneficial effect of the second aspect and any possible design manner of the second aspect, reference may be made to descriptions of the beneficial effect of the first aspect and any possible design manner of the first aspect. Details are not described herein again.

According to a third aspect, this application provides a data transmission encryption control apparatus.

In a possible design manner, the encryption control apparatus is configured to perform any method provided in the first aspect or the second aspect. In this application, the encryption control apparatus may be divided into functional modules according to any method provided in the first aspect or the second aspect. For example, each functional module may be obtained through division based on each corresponding function, or two or more functions may be integrated into one processing module. For example, in this application, the data transmission apparatus may be divided into a determining unit, an encryption unit, and the like based on functions. For descriptions of possible technical solutions performed by the foregoing functional modules and beneficial effect, refer to the technical solutions provided in the first aspect or the corresponding possible designs of the first aspect, or refer to the technical solutions provided in the second aspect or the corresponding possible designs of the second aspect. Details are not described herein again.

In another possible design, the encryption control apparatus includes a transmission interface and at least one processor. The at least one processor is configured to invoke computer instructions stored in a memory, so that the encryption control apparatus is enabled to perform any method provided in the first aspect and any possible design manner of the first aspect.

According to a fourth aspect, this application provides a computer-readable storage medium. The computer-readable storage medium includes program instructions. When the program instructions are run on a computer or a processor, the computer or the processor is enabled to perform any method provided in any possible implementation of the first aspect or the second aspect.

According to a fifth aspect, this application provides a computer program product. When the computer program product runs on a data transmission apparatus, any method provided in any possible implementation of the first aspect or the second aspect is performed.

According to a sixth aspect, this application provides a chip system, including a processor. The processor is configured to: invoke a computer program from a memory, and run the computer program stored in the memory, to perform any method provided in the implementation of the first aspect or the second aspect.

It may be understood that any one of the apparatus, the computer storage medium, the computer program product, the chip system, or the like provided above may be used in the corresponding method provided above. Therefore, for beneficial effect that can be achieved by the apparatus, the computer storage medium, the computer program product, the chip system, or the like, refer to the beneficial effect of the corresponding method. Details are not described herein again.

In this application, a name of the encryption control apparatus constitutes no limitation on devices or functional modules. In actual implementation, these devices or functional modules may have other names. Each device or functional module falls within the scope defined by the claims and their equivalent technologies in this application, provided that a function of the device or functional module is similar to that described in this application.

DETAILED DESCRIPTION OF ILLUSTRATIVE EMBODIMENTS

To better understand embodiments of this application, the following describes some terms or technologies used in embodiments of this application.

1. Blanking Interval

When a data transmit end transmits source data of a video through a media interface, a transmission time sequence of the source data of the video includes an active region and a blanking interval.

In the active region, data transmitted by the data transmit end through the media interface is valid video data. Herein, the valid video data is image frame data of the transmitted video, that is, data that can be displayed on a display. For brief description, the valid video data is referred to as video data for short in the following. In this case, data corresponding to one line of pixels in the image frame may be referred to one line of video data.

Figure 1:
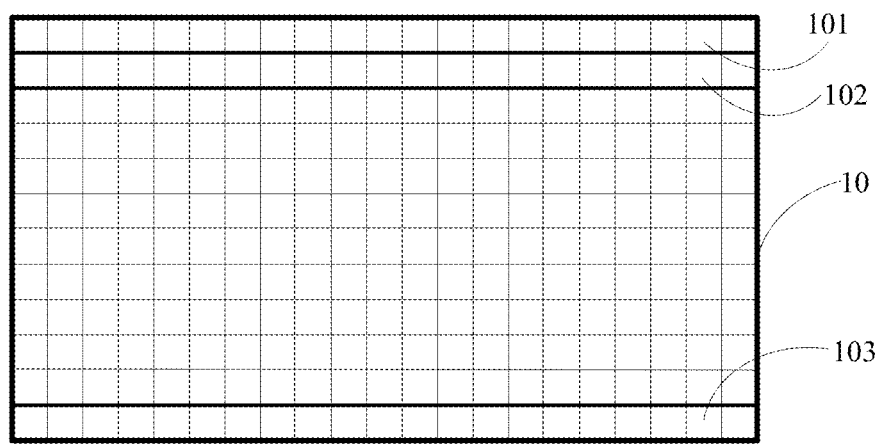
FIG. 1 is a schematic diagram of an image frame in a video according to an embodiment of this application.

FIG. 1 is a schematic diagram of an image frame in a video. As shown in FIG. 1, an image 10 represents any image frame in a to-be-transmitted video. A pixel line 101 is a first line of pixels in the image 10, and data corresponding to the pixel line 101 is a first line of video data of the image 10. A pixel line 102 is a second line of pixels in the image 10, and data corresponding to the pixel line 102 is a second line of video data of the image 10. A pixel line 103 is a last line of pixels in the image 10, and data corresponding to the pixel line 103 is a last line of video data of the image 10.

When the data transmit end transmits the to-be-transmitted video, a time period for transmitting the video data of the to-be-transmitted video may be referred to as a line active region. Generally, the active region corresponding to the video data includes a plurality of line active regions. For any one of the plurality of line active regions, the line active region is a time period for transmitting one line of video data in the video data. It can be learned that one line of video data corresponds to one line active region.

The blanking interval is included between the plurality of line active regions corresponding to the video data. Generally, the blanking interval is used to transmit invalid video data. In other words, data transmitted in the blanking interval is not the image frame data.

Generally, the blanking interval includes a line blanking interval and a field blanking interval.

The line blanking interval may also be referred to as a horizontal blanking interval (horizontal blanking). The line blanking interval generally indicates a time period between two line active regions corresponding to two consecutive lines of video data. Alternatively, it may be understood that a time period between a line active region corresponding to one line of video data and a line active region corresponding to a previous line or a next line of video data of the line of video data may be referred to as the line blanking interval.

It may be understood that, in a process in which the data transmit end transmits the video data through the media interface, a plurality of line blanking intervals are generated. It should be understood that duration of the plurality of line blanking intervals may be the same or may be different.

The field blanking interval may also be referred to as a vertical blanking interval (vertical blanking). The field blanking interval generally indicates a time period between video data corresponding to two consecutive image frames in a video that are separately transmitted by the data transmit end through the media interface. Generally, duration of the field blanking interval is greater than duration of the line blanking interval.

It should be understood that before sending the video data of the to-be-transmitted video through the media interface, the data transmit end usually first sends a blanking-end (BE) identifier, and starts to send the video data of the to-be-transmitted video after sending the BE identifier. Then, the data transmit end may send a blanking-start (BS) identifier after completing sending the line of video data in the video data, to indicate a start of a line blanking interval or a field blanking interval.

In other words, the BS identifier is used to mark the start of the blanking interval (or may be understood as marking an end of the line active region), and the BE identifier is used to mark an end of the blanking interval (or may be understood as marking a start of the line active region).

Figure 2:
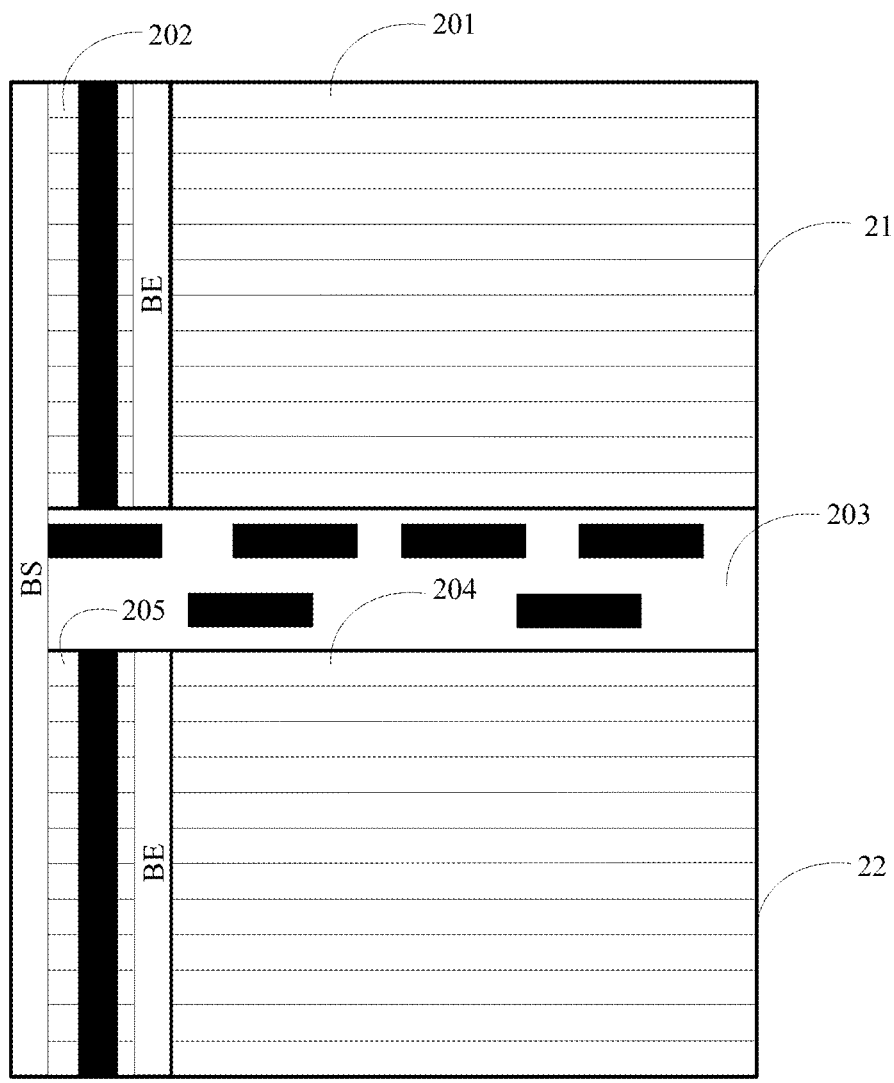
FIG. 2 is a schematic diagram of a line blanking interval and a field blanking interval according to an embodiment of this application.

FIG. 2 is a schematic diagram of a line blanking interval and a field blanking interval. As shown in FIG. 2, an image 21 and an image 22 may respectively represent two consecutive image frames in a to-be-transmitted video.

A region 201 may be used to represent a plurality of line active regions of a plurality of lines of video data corresponding to the image frame 21 transmitted by a data transmit end through a media interface. A region 202 may be used to represent a plurality of line blanking intervals after the data transmit end completes transmitting the plurality of lines of video data through the media interface.

A region 204 may be used to represent a plurality of line active regions of a plurality of lines of video data corresponding to the image frame 22 transmitted by the data transmit end through the media interface. A region 205 may be used to represent a plurality of line blanking intervals after the data transmit end completes transmitting the plurality of lines of video data through the media interface.

A region 203 may be used to represent a time period between the image frame 21 and the image frame 22 transmitted by the data transmit end through the media interface, that is, a field blanking interval between transmission of the image frame 21 and transmission of the image frame 22.

As shown in FIG. 2, a start of each blanking interval is marked by using a BS identifier, and an end of each blanking interval is marked by using a BE identifier.

(2) Other Terms

In addition, in embodiments of this application, the word "exemplary", "for example", or the like represents giving an example, an illustration, or a description. Any embodiment or design scheme described as an "example" or "for example" in embodiments of this application should not be explained as being more preferred or having more advantages than another embodiment or design scheme. To be precise, the words such as "example" or "for example" are intended to present a relative concept in a specific manner.

The terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of this application, unless otherwise stated, "a plurality of" means two or more than two.

In this application, the term "at least one" means one or more. In this application, the term "a plurality of" means two or more. For example, a plurality of second packets mean two or more second packets. The terms "system" and "network" usually may be used interchangeably in this specification. "At least one of the following items (pieces)" or a similar expression thereof indicates any combination of these items, including any combination of singular items (pieces) or plural items (pieces). For example, at least one of a, b, or c may indicate a, b, c, a and b, a and c, b and c, or a, b, and c, where a, b, and c may be singular or plural. For example, at least one of a, b, or c may indicate a, b, and c; a and b; a and c; b and c; or a, b, and c, where a, b, and c may be singular or plural.

It should be understood that the terms used in the descriptions of various examples in this specification are merely intended to describe specific examples, but are not intended to constitute a limitation. The terms "one" ("a" and "an") and "the" of singular forms used in the descriptions of various examples and the appended claims are also intended to include plural forms, unless otherwise specified in the context clearly.

It should be further understood that, the term "and/or" used in this specification indicates and includes any or all possible combinations of one or more items in associated listed items. The term "and/or" describes an association relationship between associated objects and represents that three relationships may exist. For example, A and/or B may represent the following three cases: Only A exists, both A and B exist, and only B exists. In addition, the character "/" in this application generally indicates an "or" relationship between associated objects.

It should be further understood that sequence numbers of processes do not mean execution sequences in embodiments of this application. The execution sequences of the processes should be determined based on functions and internal logic of the processes, and should not be construed as any limitation on the implementation processes of embodiments of this application.

It should be understood that determining B based on A does not mean that B is determined only based on A, and B may be alternatively determined based on A and/or other information.

It should be further understood that the term "include" (or "includes", "including", "comprises", and/or "comprising"), when being used in this specification, specifies the presence of stated features, integers, steps, operations, elements, and/or components, but does not preclude the presence or addition of one or more other features, integers, steps, operations, elements, components, and/or groups thereof.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that", "in response to determining", "when (a stated condition or event) is detected", or "in response to detecting (a stated condition or event)".

It should be understood that "one embodiment", "an embodiment", and "a possible implementation" mentioned in the entire specification mean that particular features, structures, or characteristics related to the embodiment or the implementation are included in at least one embodiment of this application. Therefore, "in one embodiment", "in an embodiment", or "in a possible implementation" appearing throughout this specification does not necessarily mean a same embodiment. In addition, these particular features, structures, or characteristics may be combined in one or more embodiments by using any appropriate manner.

Generally, for a video, source data of the video may include video data and auxiliary data. The video data is image frame data in the video. The auxiliary data is data other than the video data in the source data.

Generally, the auxiliary data may include content data and control data. The content data may include at least one of different types of data: audio data, subtitle data, bullet comment data, or logo data. The control data may include at least one of different types of data such as audio rendering data, image frame rendering data in the video, remote control data, or special effect data.

The audio data is used to play audio in the video. The subtitle data and the bullet comment data are used to display a text on an image frame of the video. It should be understood that the subtitle data is generally synchronized with the video data and the audio data. Details are not described herein. In addition, the logo data may be used to display a logo (logo) on the image frame of the video.

The audio rendering data is used to render audio, to obtain rendering data of different audio effect. This is not limited herein.

The image frame rendering data in the video includes data for rendering video data to obtain an image frame, and data for rendering the image frame to obtain different display effect. This is not limited herein.

For example, the data for rendering the video data to obtain the image frame is, for example, control information of an auxiliary video information infoframe when a playback format is an audio video interleaved (AVI) format. For another example, the data for rendering the image frame to obtain the different display effect is, for example, data for adjusting brightness and/or a contrast ratio of the entire image frame in the video, or adjusting brightness and/or a contrast ratio of a partial region of the image frame in the video. This is not limited herein.

The remote control data may be used to remotely operate the video image frame in the video. Therefore, the remote control data may include data for operating the video image frame in the video. For example, when the video is a game video played on a mobile phone of a user, if the game video is projected from the mobile phone of the user to a television (television, TV), the user may operate a button on the mobile phone to control an interface of the game video displayed on the TV. In this scenario, data for controlling the game interface on the TV by using the button on the mobile phone is the remote control data.

The special effect data is usually used to display different images on different image frames in the video. In this way, as the video is played, the different images may be presented as a special effect animation.

It should be understood that the foregoing descriptions of the content data and the control data included in the auxiliary data are merely examples for description, and the description does not constitute a limitation on this embodiment of this application.

Generally, the video data of the to-be-transmitted video is transmitted in the line active region; and the auxiliary data may be transmitted in the line active region, or may be transmitted in the blanking interval (including the line blanking interval and the field blanking interval). This is not limited in this embodiment of this application. To improve transmission security of the video data and the auxiliary data, the to-be-transmitted data is usually first encrypted and then transmitted.

For example, the media interface is a DP interface. When the video data and the auxiliary data are transmitted through the DP interface, a single-stream transport (SST) mode and a multi-stream transport (MST) mode are usually included.

In the SST mode, only one video stream is transmitted on the DP interface. In this case, the DP protocol specifies that, in a process of transmitting the video data, a 512th BS identifier in every 512 consecutive BS identifiers is replaced with a content protection scrambler reset (CPSR) identifier or a scrambler reset (SR) identifier. The CPSR identifier indicates that data transmitted after the identifier is first encrypted before being transmitted and then transmitted. The SR identifier indicates that data transmitted after the identifier does not need to be encrypted and can be directly transmitted.

It can be learned that, when the DP interface is in the SST mode, a data encryption granularity is 512 lines. One of the 512 lines may be a line formed based on a line blanking interval, or may be a line formed based on a line blanking interval and a line active region. This is not limited herein. In other words, the video data and the auxiliary data transmitted in the 512 lines are all encrypted, or neither the video data nor the auxiliary data is encrypted. In this case, in actual application, the video data (for example, video data that does not need to be encrypted) and the auxiliary data (for example, the foregoing control data) that do not need to be encrypted and that are transmitted in the 512 lines are also encrypted, thereby increasing system power consumption caused by an encryption operation of a data transmission apparatus.

In the MST mode, a plurality of independent video streams may be simultaneously transmitted on the DP interface. For example, in the MST mode, the DP interface may simultaneously transmit two independent video streams, such as a video stream 1 and a video stream 2. Generally, video content corresponding to the video stream 1 is different from video content corresponding to the video stream 2.

In this case, the DP protocol specifies that an encryption control field (ECF) sequence is sent after every 1024 multi-stream transport packets (MTP), and the ECF sequence carries control information indicating whether to encrypt the MTPs following the sequence. The ECF sequence may be used to enable encryption of the MTPs. Each MTP packet includes at least one segment of video data or auxiliary data of each video stream transmitted in the MST mode. A boundary of the 1024 MTPs is usually marked by using an SR identifier. The SR identifier may be inserted by replacing a multi-stream transport packet header (MTP-header) of a 1024th MTP in every 1024 MTPs.

It may be learned that, in the MST mode, the data encryption granularity of the DP interface is 1024 MTPs. In other words, all the 1024 MTPs are all encrypted, or none of the 1024 MTPs is encrypted. In this case, in actual application, data in the 1024 MTPs that does not need to be encrypted (for example, video data or auxiliary data (such as the foregoing control data) that does not need to be encrypted) is also encrypted, thereby increasing system power consumption caused by the encryption operation of the data transmission apparatus. In addition, because there is no time sequence requirement for video data in each video stream stored in the MTP, encryption cannot be performed on specified video data in the to-be-transmitted video in this method.

For another example, the media interface is an HDMI interface. When the to-be-transmitted video is transmitted through the HDMI interface, whether the data of the to-be-transmitted video is encrypted is usually controlled by setting an encryption identifier in a preset time window (for example, a win_of_opp_window) of the field blanking interval. For example, if an encryption enable (for example, enc_en) identifier is set in the preset time window, data transmitted after the encryption enable identifier is set is first encrypted and then transmitted. After an encryption disable (for example, enc_dis) identifier is set in another preset time window, data after the encryption disable identifier is set is directly transmitted without being encrypted.

Because the field blanking interval is a blanking interval between transmission of video data of two consecutive image frames, a data encryption granularity controlled by the HDMI interface is a frame. To be specific, video data that is transmitted in a plurality of line active regions corresponding to one image frame and auxiliary data that is transmitted in a blanking interval corresponding to the plurality of line active regions are both encrypted, or neither of video data that is transmitted in a plurality of line active regions corresponding to one picture frame nor auxiliary data that is transmitted in a blanking interval corresponding to the plurality of line active regions is encrypted. In this case, in actual application, the video data that does not need to be encrypted (for example, the video data that does not need to be encrypted) in the plurality of line active regions corresponding to the image frame and the auxiliary data (for example, the control data) that does not need to be encrypted and that is transmitted in the blanking interval between the plurality of line active regions are also encrypted, thereby increasing system power consumption caused by an encryption operation of the data transmission apparatus.

On this basis, an embodiment of this application provides a data transmission encryption control method. According to the method, an encryption identifier is inserted in advance into each to-be-transmitted data packet that needs to be encrypted, so that the data transmission apparatus can first encrypt the data packet and then transmit the data packet. The data packet may be a video data packet obtained based on one line of video data in the to-be-transmitted video, or may be an auxiliary data packet obtained based on auxiliary data in the to-be-transmitted video. According to the method, a data encryption granularity of the to-be-transmitted video is greatly reduced. In this way, data of specified video content or specified auxiliary data can be encrypted for transmission, and data that does not need to be encrypted is not encrypted for transmission. Therefore, the data transmission apparatus does not need to perform an unnecessary encryption operation, thereby reducing system power consumption of the data transmission apparatus.

An embodiment of this application further provides a data transmission encryption control apparatus. The encryption control apparatus may be used in a data sending apparatus in a data transmission system.

It should be understood that the encryption apparatus may be understood as a functional module in the data sending apparatus, and the functional module is configured to control whether to encrypt data in a video transmitted by the data sending apparatus. Therefore, the method provided in the embodiment of this application may also be understood as a method performed by the data sending apparatus.

The data sending apparatus may be any terminal device that can obtain source data of the to-be-transmitted video. The terminal device may be a terminal device such as a set-top box (STB), a mobile phone, a tablet, a notebook computer, a desktop computer, or a surveillance camera. This is not limited herein.

For example, the to-be-transmitted video may be a video captured by the terminal device in advance through a camera, may be a video downloaded by the terminal device from a network, may be a video obtained after the terminal device edits an image in a local gallery by using video editing software, may be a video obtained by the terminal device from an external storage medium such as an optical disc, or the like. This is not limited in this embodiment of this application.

Figure 3:
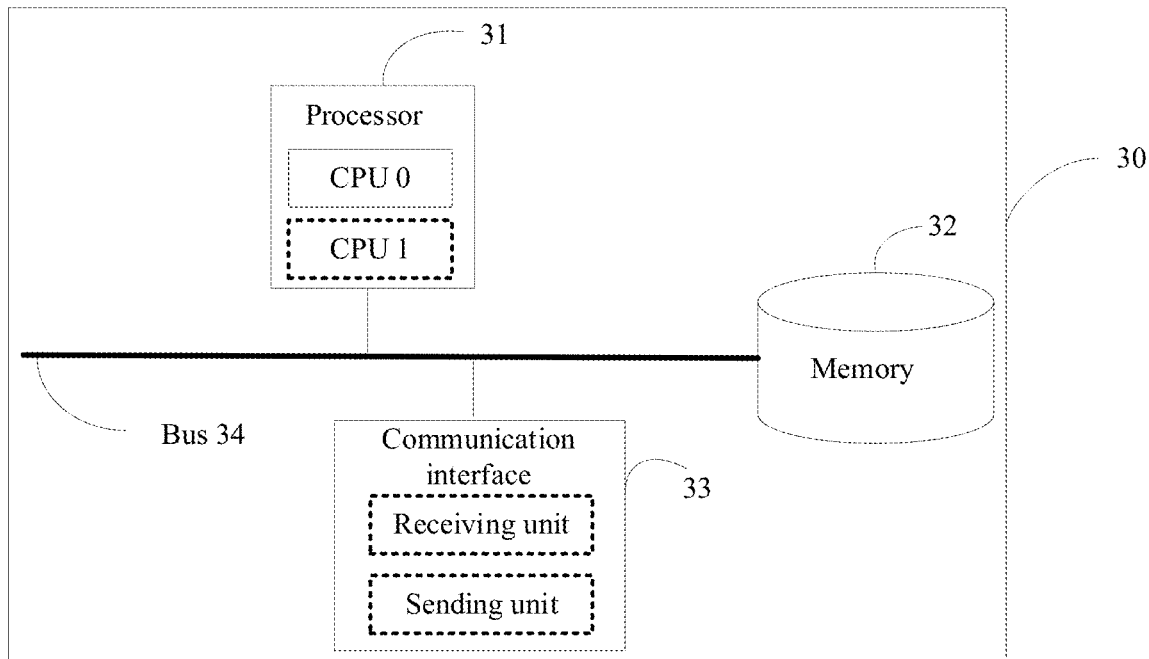
FIG. 3 is a schematic diagram of a hardware structure of a data sending apparatus according to an embodiment of this application.

FIG. 3 is a schematic diagram of a hardware structure of a data sending apparatus. As shown in FIG. 3, a data sending apparatus 30 includes a processor 31, a memory 32, a communication interface 33, and a bus 34. The processor 31, the memory 32, and the communication interface 33 may be connected through the bus 34.

The processor 31 is a control center of the data sending apparatus 30, and may be a general-purpose central processing unit (CPU), another general-purpose processor, or the like. The general-purpose processor may be a microprocessor, any conventional processor, or the like.

For example, the processor 31 may include one or more CPUs, such as a CPU 0 and a CPU 1 shown in FIG. 3.

The memory 32 may be a read-only memory (ROM) or another type of static storage device that can store static information and instructions, a random access memory (RAM) or another type of dynamic storage device that can store information and instructions, an electrically erasable programmable read-only memory (EEPROM), a magnetic disk storage medium or another magnetic storage device, or any medium that can carry or store expected program code in a form of instructions or a data structure and that can be accessed by a computer. This is not limited herein.

In a possible implementation, the memory 32 may be independent of the processor 31. The memory 32 may be connected to the processor 31 through the bus 34, and is configured to store data, instructions, or program code. When the processor 31 invokes and executes the instructions or the program code stored in the memory 32, the data transmission encryption control method provided in this embodiment of this application can be implemented.

In another possible implementation, the memory 32 may be alternatively integrated with the processor 31.

The communication interface 33 is configured to connect the data sending apparatus 30 to another device (for example, a data receiving apparatus or a server) through communication. The data sending apparatus 30 and the data receiving apparatus may be connected and communicate with each other through a cable, wireless fidelity (Wi-Fi), Bluetooth, or the like. The data sending apparatus 30 and the server may be connected and communicate with each other through the Ethernet, a radio access network (RAN), a wireless local area network (WLAN), or the like. The communication interface 33 may include: a receiving unit configured to receive data, and a sending unit configured to send data.

The bus 34 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 3, but this does not indicate that there is only one bus or only one type of bus.

It should be noted that the structure shown in FIG. 3 does not constitute a limitation on the data sending apparatus 30. In addition to the components shown in FIG. 3, the data sending apparatus 30 may include more or fewer components than the components shown in the figure, or combine some components, or have different component arrangements.

An embodiment of this application further provides a data transmission system. The system may include the foregoing data sending apparatus and the foregoing data receiving apparatus.

The encryption apparatus used in the data sending apparatus may be configured to perform the data transmission encryption control method provided in the embodiment of this application. Alternatively, it may be understood that the data sending apparatus is configured to perform the data transmission encryption control method provided in the embodiment of this application.

The data sending apparatus and the data receiving apparatus may be connected and communicate with each other in a wired or wireless manner. Herein, the wired communication manner may be connection and communication through a cable, and the wireless communication manner may be connection and communication in a wireless manner such as Bluetooth, Wi-Fi, or infrared transmission. This is not specifically limited in this embodiment of this application.

It should be understood that, for a hardware structure of the data receiving apparatus, reference may be made to the description of the hardware structure of the data sending apparatus 30. Details are not described herein again. It may be understood that, compared with the hardware structure of the data sending apparatus 30, the data receiving apparatus may further include a display and an audio module.

The display may be configured to display, based on video data received by the data receiving apparatus, an image frame corresponding to the video data. Herein, the display may be a light-emitting diode (LED) display, a liquid crystal display (LCD), or the like. This is not limited herein.

The audio module may be configured to: convert audio data received by the data receiving apparatus into an analog audio signal, and play a sound signal corresponding to the audio signal. For example, the audio module plays music corresponding to the audio data received by the data receiving apparatus, audio in a video, and the like. This is not limited herein.

The audio module may include at least one of a loudspeaker, a loudspeaker interface (for example, an interface connected to a sound box), a headset interface, and the like. This is not limited herein. The loudspeaker may also be referred to as a "horn", and is configured to convert an audio electrical signal into a sound signal. The loudspeaker interface is configured to connect to an external loudspeaker in the wired or wireless manner. The external loudspeaker may be, for example, an external sound box device. This is not limited herein. The headset interface is configured to: connect to a wired headset, or connect to a wireless headset through Bluetooth. This is not limited herein. The headset interface may be a USB interface, or may be an open mobile terminal platform (OMTP) standard interface, a cellular telecommunications industry association of the USA (CTIA) standard interface, or the like. This is not limited herein.

Figure 4:
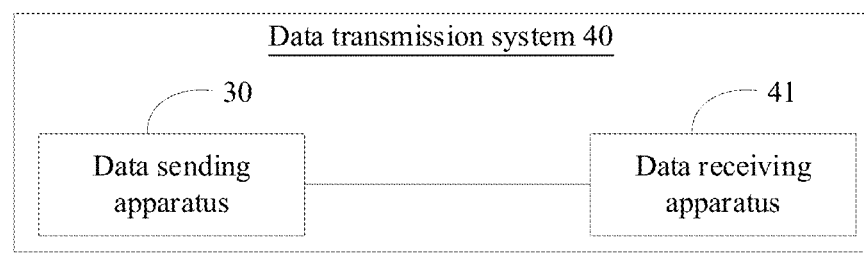
FIG. 4 is a schematic diagram of an architecture of a data transmission system according to an embodiment of this application.

FIG. 4 is a schematic diagram of an architecture of a data transmission system. As shown in FIG. 4, the data transmission system 40 includes the foregoing data sending apparatus 30 and a data receiving apparatus 41. In addition, the data sending apparatus 30 and the data receiving apparatus 41 may be connected and communicate with each other in a wired or wireless manner.

The data sending apparatus 30 is configured to: obtain source data of a to-be-transmitted video; and when transmitting the source data of the to-be-transmitted video to the data receiving apparatus 41 through the wired or wireless communication connection, perform the method provided in the embodiment of this application, to first encrypt data that needs to be encrypted and that is in the source data and then transmit the encrypted data. In this way, after receiving the source data that is of the to-be-transmitted video and that is transmitted by the data sending apparatus 30, the data receiving apparatus 41 decrypts the encrypted data and performs other processing, and then can play the corresponding video.

Figure 5:
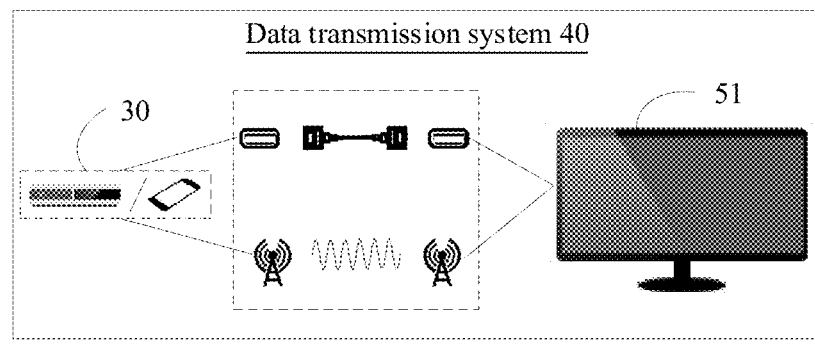
FIG. 5 is a schematic diagram of a data transmission system in an actual scenario according to an embodiment of this application.

For example, FIG. 5 is a schematic diagram of a data transmission system in an actual scenario.

As shown in FIG. 5, the data transmission system 40 may include the data sending apparatus 30 and a TV 51 serving as a data receiving apparatus. The data sending apparatus 30 may be an STB or a mobile phone.

When the data sending apparatus 30 is the STB, the STB may download source data of a to-be-transmitted video from a server. When the data sending apparatus 30 is the mobile phone, the mobile phone may store source data of a to-be-transmitted video that is captured in advance or downloaded from a network in advance.

In this way, in a process of transmitting the source data of the to-be-transmitted video to the TV 51, the data sending apparatus 30 may perform the method provided in the embodiment of this application, to first encrypt data that needs to be encrypted and that is in the source data, and then send the encrypted data to the TV 51 in a wired or wireless communication manner. In this way, after receiving the source data sent by the data sending apparatus 30, the TV 51 may first decrypt the encrypted data in the source data and perform other processing on the encrypted data, and then can play a video corresponding to the source data.

It can be learned that, the STB serving as the data sending apparatus 30 may perform the method provided in the embodiment of this application, to control to encrypt data that needs to be encrypted in the to-be-transmitted video and then transmit the encrypted data to the TV 51, and transparently transmit, to the TV 51, data that does not need to be encrypted. In this way, the TV 51 decrypts the received encrypted data, and plays the decrypted data and the received unencrypted data.

The mobile phone serving as the data sending apparatus 30 may perform the method provided in the embodiment of this application, to control to project, to the TV 51 through encrypted transmission, data that needs to be encrypted and that is in a video stored in the mobile phone, and to project, to the TV 51 through transparent transmission, data that does not need to be encrypted. In this way, the TV 51 decrypts the received encrypted data, and plays the decrypted data and the received unencrypted data.

The following describes the method provided in the embodiment of this application with reference to the accompanying drawings.

Figure 6:
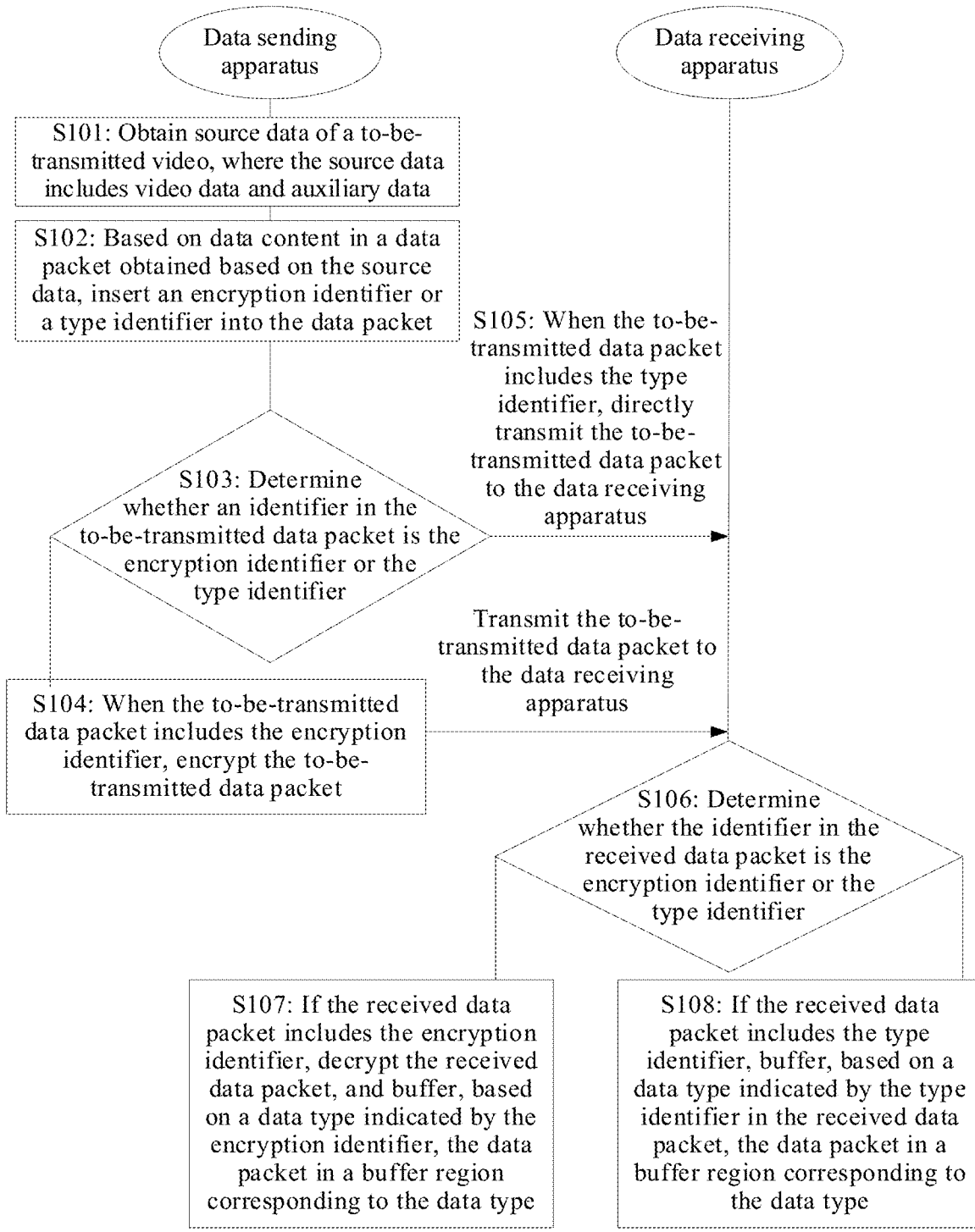
FIG. 6 is a schematic flowchart of a data transmission encryption control method according to an embodiment of this application.

FIG. 6 is a schematic flowchart of a data transmission encryption control method according to an embodiment of this application. The method may be applied to the data transmission system 40 shown in FIG. 4 or FIG. 5. The method may include the following steps.

S101: A data sending apparatus obtains source data of a to-be-transmitted video. The source data includes video data and auxiliary data.

For descriptions of the to-be-transmitted video, the video data, and the auxiliary data, refer to the foregoing descriptions. Details are not described herein again.

For example, the data sending apparatus may capture the to-be-transmitted video in advance through a camera, to obtain the source data of the to-be-transmitted video. Alternatively, the data sending apparatus may download the to-be-transmitted video from a network, to obtain the source data of the to-be-transmitted video. Alternatively, the data sending apparatus may edit an image in a local gallery in advance by using video editing software, to obtain the to-be-transmitted video. In this way, the data sending apparatus obtains the source data of the to-be-transmitted video. Alternatively, the data sending apparatus may obtain the source data of the to-be-transmitted video from an external storage medium such as an optical disc, and the like. This is not limited in this embodiment of this application.

S102: Based on data content in a data packet obtained based on the source data, the data sending apparatus inserts an encryption identifier or a type identifier into the data packet.

The encryption identifier may indicate that the data packet including the encryption identifier is transmitted in an encrypted transmission mode, and indicate a data type of data in the data packet including the encryption identifier. The data type of the data in the data packet includes video data and auxiliary data. For descriptions of the auxiliary data, refer to the foregoing descriptions. Details are not described herein again.

For example, the encryption identifier may include an encryption start identifier and an encryption end identifier. For example, for the video data, the encryption start identifier may be an active video protection start (AVPS) identifier, and the encryption end identifier may be an active video protection end (AVPE) identifier. For another example, for the auxiliary data, the encryption start identifier may be an auxiliary data protection start (ADPS) identifier, and the encryption end identifier may be an auxiliary data protection end (ADPE) identifier.

It should be understood that, that the data packet is transmitted in the encrypted transmission mode means that when transmitting the data packet, the data sending apparatus needs to first encrypt the data packet and then transmit the encrypted data packet.

The type identifier may indicate a data type of data in the data packet including the type identifier.

For example, the type identifier may include a type start identifier and a type end identifier. For example, for the video data, the type start identifier may be an active video start (AVS) identifier, and the type end identifier may be an active video end (AVE) identifier. For another example, for the auxiliary data, the type start identifier may be an auxiliary data start (ADS) identifier, and the type end identifier may be an auxiliary data end (ADE) identifier.

Specifically, the data packet may be a video data packet, or may be an auxiliary data packet. This is not limited herein.

The video data packet may be obtained by the data sending apparatus based on a first line of video data of the to-be-transmitted video obtained in step S101. The first line of video data is any line of video data of the to-be-transmitted video. For descriptions of one line of video data, refer to the foregoing descriptions. Details are not described herein again.

Optionally, the data sending apparatus may determine at least one video data packet based on the first line of video data.

In a possible case, the data sending apparatus may determine the first line of video data as one video data packet.

In another possible case, the data sending apparatus may split the first line of video data into a plurality of segments of video data. Each of the plurality of segments of video data is one video data packet.

In a possible implementation, the data sending apparatus may split the first line of video data into a plurality of video data packets based on a preset length. Herein, the preset length is less than a length of the first line of video data.

In another possible implementation, the data sending apparatus may split the first line of video data into a preset quantity of video data packets. Herein, a value of the preset quantity is an integer greater than 1. It should be understood that a size (or a length) of video data in each video data packet obtained in this manner is not limited in this embodiment of this application.

Figure 7A:
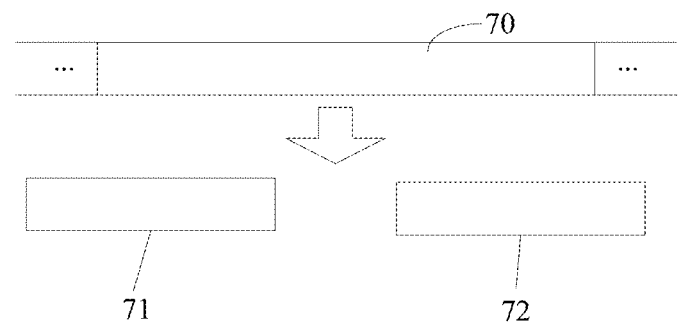
FIG. 7a is a schematic diagram in which a data sending apparatus splits one line of video data into a plurality of video data packets according to an embodiment of this application.

For example, FIG. 7a is a schematic diagram in which a data sending apparatus splits one line of video data into a plurality of video data packets. As shown in FIG. 7a, for any line of video data 70 in a to-be-transmitted video, the data sending apparatus may split the line of video data 70 into two segments of video data that are respectively a data segment 71 and a data segment 72. In this way, the data segment 71 may be used as one video data packet, and the data segment 72 may be used as another video data packet.

It should be understood that the data sending apparatus may further split one line of video data into a plurality of video data packets according to any rule. This is not limited in this embodiment of this application.

For example, the data sending apparatus may further split one line of video data in a first image frame into a plurality of video data packets based on a location of a preset region in the first image frame of the to-be-transmitted video.

Herein, video data corresponding to an image in the preset region is data that needs to be encrypted for transmission.

Figure 7B:
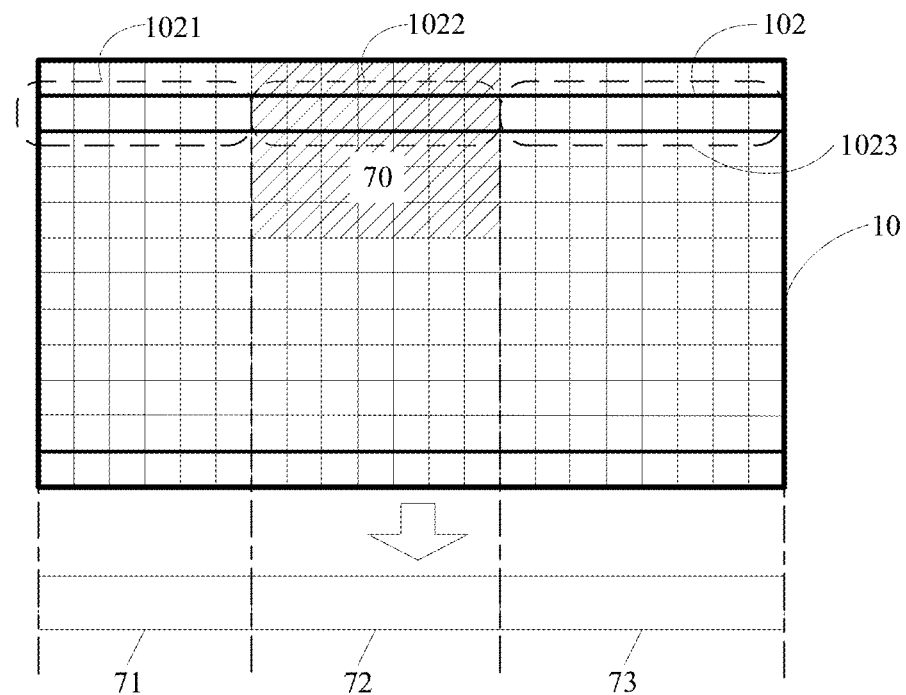
FIG. 7b is another schematic diagram in which a data sending apparatus splits one line of video data into a plurality of video data packets according to an embodiment of this application.

For example, with reference to FIG. 1, FIG. 7b is another schematic diagram in which a data sending apparatus splits one line of video data into a plurality of video data packets. As shown in FIG. 7b, if an image in a preset region 70 in the image frame 10 is an image that needs to be encrypted for transmission, for a line of video data corresponding to the pixel line 102 in the image frame 10, the data sending apparatus may split the pixel line 102 into a pixel segment 1021, a pixel segment 1022, and a pixel segment 1023 based on an edge location of the preset region 70. Correspondingly, a data segment 71 corresponding to the pixel segment 1021 may be used as a video data packet 1, a data segment 72 corresponding to the pixel segment 1022 may be used as a video data packet 2, and a data segment 73 corresponding to the pixel segment 1023 may be used as a video data packet 3. It can be learned that video data in the video data packet 2 is video data in a second pixel line of the preset region 70.

Certainly, the data segment 72 corresponding to the pixel segment 1022 may also be split into a plurality of data segments. In other words, the data segment 72 may also be split into a plurality of video data packets. This is not limited in this embodiment of this application.

In addition, the auxiliary data packet may be obtained by the data sending apparatus based on the auxiliary data of the to-be-transmitted video obtained in step S101. For descriptions of the auxiliary data, refer to the foregoing descriptions. Details are not described again.

It should be understood that the auxiliary data in the to-be-transmitted video may include only one type of auxiliary data. For example, the auxiliary data includes only audio data. Certainly, the auxiliary data of the to-be-transmitted video may also include a plurality of different types of auxiliary data, for example, audio data, subtitle data, and remote control data. This is not limited in this embodiment of this application. In this case, if the auxiliary data of the to-be-transmitted data includes a plurality of types of data, the data sending apparatus may obtain different types of auxiliary data packets based on the plurality of types of auxiliary data. For example, an audio data packet may be obtained based on the audio data, a subtitle data packet may be obtained based on the subtitle data, and a remote control data packet may be obtained based on the remote control data. Details are not described.

Optionally, the data sending apparatus may split the auxiliary data into a plurality of auxiliary data packets according to a preset rule. The preset rule is not specifically limited in this embodiment of this application.

The auxiliary data being the audio data is used as an example. In this case, the preset rule may be encapsulating, into an audio data packet, audio data obtained after a preset quantity of consecutive sampling times. In other words, the data sending apparatus may divide the audio data of the to-be-transmitted video into a plurality of data segments in a unit of audio data that is collected when a quantity of consecutive sampling times is the preset quantity of times. Each of the plurality of data segments is one audio data packet.

Figure 8:
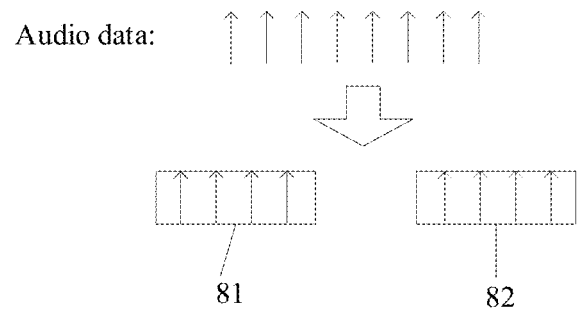
FIG. 8 is a schematic diagram of splitting audio data into audio data packets according to an embodiment of this application.

For example, FIG. 8 is a schematic diagram of splitting audio data into audio data packets. FIG. 8 shows a segment of audio data collected at a preset sampling frequency. If a value of the preset quantity of times is 4, the data sending apparatus may divide the audio data shown in FIG. 8 into two data segments that are respectively a data segment 81 and a data segment 82. The data segment 81 and the data segment 82 each include audio data obtained through four consecutive times of sampling. In this way, the data segment 81 may be used as one audio data packet, and the data segment 82 may be used as another audio data packet.

Then, the data sending apparatus may insert the encryption identifier or the type identifier into the data packet based on the data content in the determined data packet (including the video data packet and the auxiliary data packet).

Specifically, the data sending apparatus may first determine, based on the data content in the data packet, whether the data in the data packet needs to be encrypted.

The data sending apparatus may predetermine, based on a received encryption request or according to a predefined rule, data that needs to be encrypted for transmission. In this way, based on the determined data that needs to be encrypted, the data sending apparatus may determine whether the data in the currently processed data packet needs to be encrypted.

Herein, the encryption request may be an encryption request delivered by a provider that provides the source data of the to-be-transmitted video, or may be an encryption request input by a user that operates the data sending apparatus. This is not limited in this embodiment of this application. For example, the encryption request may be encrypting the image in the preset region in the first image frame of the to-be-transmitted video. The predefined rule may be a rule predefined by the data sending apparatus based on a data type. For example, the control data usually does not need to be encrypted. Therefore, the data sending apparatus may predefine a rule, and the rule indicates that the control data is data that does not need to be encrypted.

In a case, if the data packet is the video data packet, when the data sending apparatus determines that video data in the currently processed video data packet is data that needs to be encrypted, the data sending apparatus inserts the encryption identifier into the video data packet. For example, the data sending apparatus inserts the AVPS identifier before the video data included in the video data packet, and inserts the AVPE identifier after the video data. This indicates that the video data packet including the video data is transmitted in the encrypted transmission mode. When the data sending apparatus determines that the video data in the currently processed video data packet is data that does not need to be encrypted, the data sending apparatus inserts the type identifier into the video data packet. For example, the data sending apparatus inserts the AVS identifier before the video data included in the video data packet, and inserts the AVE identifier after the video data. This indicates that the video data packet including the video data does not need to be encrypted for transmission, and can be directly transparently transmitted.

Figure 9:
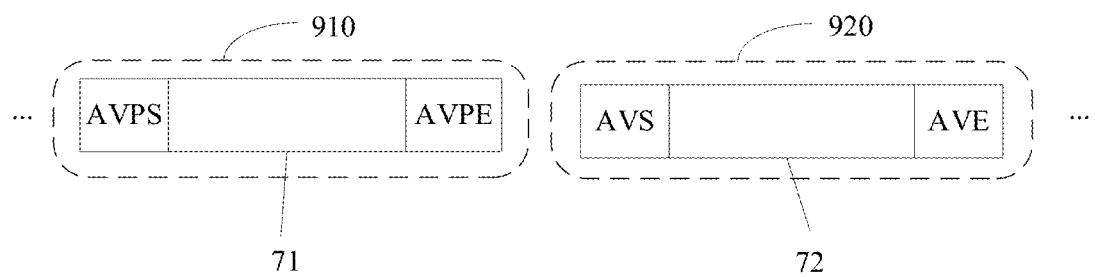
FIG. 9 is a schematic diagram of inserting an encryption identifier and a type identifier into a video data packet according to an embodiment of this application.

For example, with reference to FIG. 7, FIG. 9 is a schematic diagram of inserting an encryption identifier and a type identifier into a video data packet. As shown in FIG. 9, video data in a video data packet 910 is the data segment 71, and video data in a video data packet 920 is the data segment 72.

When the data sending apparatus determines that the data segment 71 is data that needs to be encrypted, the data sending apparatus inserts the AVPS identifier before the data segment 71, and inserts the AVPE identifier after the data segment 71. This indicates that the video data packet 910 is transmitted in the encrypted transmission mode. When the data sending apparatus determines that the data segment 72 is data that does not need to be encrypted, the data sending apparatus inserts the AVS identifier before the data segment 72, and inserts the AVE identifier after the data segment 72.

This indicates that the video data packet 920 does not need to be encrypted for transmission and can be transparently transmitted.

In another case, if the foregoing data packet is the auxiliary data packet, when the data sending apparatus determines that the auxiliary data in the currently processed auxiliary data packet is data that needs to be encrypted, the data sending apparatus inserts the encryption identifier into the auxiliary data packet. For example, the data sending apparatus inserts the ADPS identifier before the auxiliary data included in the auxiliary data packet, and inserts the ADPE identifier after the auxiliary data. This indicates that the auxiliary data packet including the auxiliary data is transmitted in the encrypted transmission mode. When the data sending apparatus determines that the auxiliary data in the currently processed auxiliary data packet is data that does not need to be encrypted, the data sending apparatus inserts the type identifier into the auxiliary data packet. For example, the data sending apparatus inserts the ADS identifier before the auxiliary data included in the auxiliary data packet, and inserts the ADE identifier after the auxiliary data. This indicates that the auxiliary data packet including the auxiliary data does not need to be encrypted for transmission, and can be directly transparently transmitted.

Figure 10:
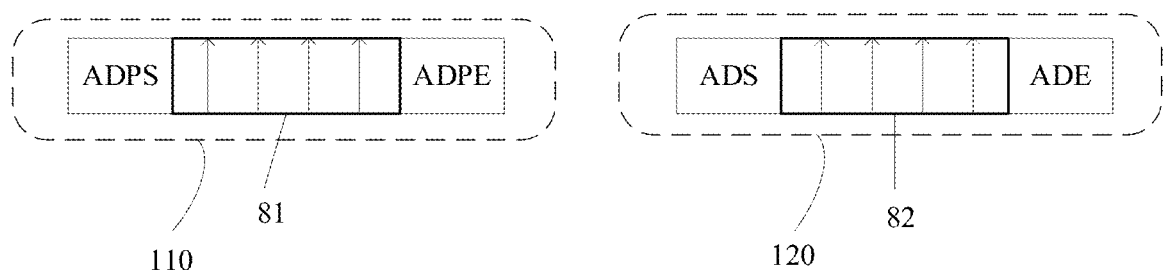
FIG. 10 is a schematic diagram of inserting an encryption identifier and a type identifier into an audio data packet according to an embodiment of this application.

With reference to FIG. 8 and FIG. 10, the auxiliary data being the audio data is used as an example. FIG. 10 is a schematic diagram of inserting an encryption identifier and a type identifier into an audio data packet. As shown in FIG. 10, audio data in an audio data packet no is the data segment 81, and audio data in an audio data packet 120 is the data segment 82.

When the data sending apparatus determines that the data segment 81 is data that needs to be encrypted, the data sending apparatus inserts the ADPS identifier before the data segment 81, and inserts the ADPE identifier after the data segment 81. This indicates that the audio data packet 110 is transmitted in the encrypted transmission mode. When the data sending apparatus determines that the data segment 82 is data that does not need to be encrypted, the data sending apparatus inserts the ADS identifier before the data segment 82, and inserts the ADE identifier after the data segment 82. This indicates that the audio data packet 120 does not need to be encrypted for transmission, and can be transparently transmitted.

It should be understood that, if the to-be-transmitted video includes only one type of auxiliary data, a process of inserting the encryption identifier and the type identifier into the auxiliary data packet may be implemented by performing a process shown in FIG. 10.

If the to-be-transmitted video includes a plurality of types of auxiliary data,
in a possible implementation, the encryption (type) identifier may include the encryption (type) start identifier, the encryption (type) end identifier, and an auxiliary data type identifier.

For example, when the auxiliary data includes the audio data, the subtitle data, and the remote control data, and a value of the auxiliary data type identifier is 1, it indicates that a type of the auxiliary data is the audio data; when a value of the auxiliary data type identifier is 2, it indicates that a type of the auxiliary data is the subtitle data; or when a value of the auxiliary data type identifier is 3, it indicates that the type of the auxiliary data is the remote control data.

In this case, the encryption identifier of the audio data packet may be represented by using the ADPS, the ADPE, and the auxiliary data type identifier with the value of 1, and the type identifier of the audio data packet may be represented by using the ADS, the ADE, and the auxiliary data type identifier with the value of 1.

Similarly, the encryption identifier of the subtitle data packet may be represented by using the ADPS, the ADPE, and the auxiliary data type identifier with the value of 2, and the type identifier of the subtitle data packet may be represented by using the ADS, the ADE, and the auxiliary data type identifier with the value of 2. In addition, the encryption identifier of the remote control data packet may be represented by using the ADPS, the ADPE, and the auxiliary data type identifier with the value of 3, and the type identifier of the remote control data packet may be represented by using the ADS, the ADE, and the auxiliary data type identifier with the value of 3. Details are not described again.

In another possible implementation, for any type of auxiliary data, the encryption (type) identifier may include an encryption (a type) start identifier of the type of auxiliary data and an encryption (a type) end identifier of the type of auxiliary data.

For example, for the audio data, the encryption identifier may be represented by using an audio data protection start identifier and an audio data protection end identifier, and the type identifier may be represented by using an audio data start identifier and an audio data end identifier. For the subtitle data, the encryption identifier may be represented by using a subtitle data protection start identifier and a subtitle data protection end identifier, and the type identifier may be represented by using a subtitle data start identifier and a subtitle data end identifier. For the remote control data, the encryption identifier may be represented by using a remote control data protection start identifier and a remote control data protection end identifier, and the type identifier may be represented by using a remote control data start identifier and a remote control data end identifier. Details are not described again.

It should be understood that, after inserting the encryption identifier or the type identifier into the data packet, the data sending apparatus may buffer the data packet in a corresponding buffer to wait for sending.

For example, the data sending apparatus may buffer the video data packet in a video data buffer to wait for sending, buffer the audio data packet in an audio data buffer to wait for sending, buffer the subtitle data packet in a subtitle data buffer to wait for sending, and buffer the remote control data packet in a remote control data buffer to wait for sending. This is not described herein.

S103: The data sending apparatus determines whether the identifier in the to-be-transmitted data packet is the encryption identifier or the type identifier. The to-be-transmitted data packet is the data packet into which the encryption identifier or the type identifier is inserted.

It may be understood that, after the data sending apparatus performs step S102, a buffer of the data sending apparatus may include at least one data packet into which the encryption identifier or the type identifier is inserted. Therefore, the data sending apparatus may first determine the to-be-transmitted data packet in the at least one data packet buffered in the buffer, and then further determine whether the identifier in the to-be-transmitted data packet is the encryption identifier or the type identifier. The to-be-transmitted data packet is a data packet that the data sending apparatus currently prepares to send.

In a possible implementation, the data sending apparatus may determine, as the to-be-transmitted data packet, any data packet buffered in the buffer, and then further determine whether the identifier in the data packet is the encryption identifier or the type identifier.

In another possible implementation, the data sending apparatus may determine, according to a scheduling rule, the to-be-transmitted data packet in the at least one data packet buffered in the buffer, and then further determine whether the identifier in the data packet is the encryption identifier or the type identifier. The scheduling rule indicates a sending order of the at least one data packet buffered in the buffer of the data sending apparatus. In this way, according to the scheduling rule, the data sending apparatus may determine the data packet currently to be transmitted as the to-be-transmitted data packet, and further determine whether the identifier in the data packet is the encryption identifier or the type identifier.

It may be understood that the scheduling rule may be a scheduling rule preset by the data sending apparatus, or may be a scheduling rule obtained by the data sending apparatus in advance. This is not limited in this embodiment of this application.

Optionally, the scheduling rule may include a priority (SP) scheduling rule or a round robin (RR) scheduling rule. The RR scheduling rule may be any scheduling rule optimized as a weighted round robin (WRR) scheduling rule, a deficit round robin (DRR) scheduling rule, a deficit weighted round robin (DWRR) scheduling rule, or the like. Details are not described in this embodiment of this application.

That the scheduling rule is the SR scheduling rule is used as an example. The SR scheduling rule indicates the data sending apparatus to sequentially send the data packets based on priorities of data types of data in the at least one data packet buffered in the buffer of the data sending apparatus. The data sending apparatus first sends a data packet corresponding to a high-priority data type, and then sends a data packet corresponding to a low-priority data type.

That the video data packet, the audio data packet, and the subtitle data packet are buffered in the buffer of the data sending apparatus is used as an example. If a priority of the video data is higher than that of the audio data, a priority of the audio data is higher than that of the subtitle data, in this case, according to the SR scheduling rule, the data sending apparatus determines to first send the video data packet including the video data. Then, when no unsent video data packet exists in the video data buffer, the audio data packet buffered in the audio buffer is sent. Then, when no unsent audio data packet exists in the audio buffer, the subtitle data packet buffered in the subtitle data buffer is sent. In this way, the data sending apparatus determines the data packet currently to be sent as the to-be-transmitted data packet according to the SR scheduling rule. Then the data sending apparatus further determines whether the identifier in the to-be-transmitted data packet is the encryption identifier or the type identifier.

When the data sending apparatus determines that the to-be-transmitted data packet includes the encryption identifier, step S104 is performed. When the data sending apparatus determines that the to-be-transmitted data packet includes the type identifier, step S105 is performed.

S104: When the to-be-transmitted data packet includes the encryption identifier, the data sending apparatus encrypts the to-be-transmitted data packet, and transmits the to-be-transmitted data packet to a data receiving apparatus.

The data sending apparatus may encrypt the to-be-transmitted data packet in any encryption mode. An encryption mode is not specifically limited in this embodiment of this application.

Optionally, after encrypting the to-be-transmitted data packet, the data sending apparatus may directly transmit the data packet to the data receiving apparatus.

Optionally, after encrypting the to-be-transmitted data packet, the data sending apparatus may encode the encrypted data packet, and then transmit the encoded data packet to the data receiving apparatus. In this way, a bit error rate may be reduced when the data packet is transmitted on a link.

Optionally, if the link between the data sending apparatus and the data receiving apparatus has a structural requirement for the transmitted data flow, the data sending apparatus further encapsulates the encoded data packet, to meet the structural requirement of the link between the data sending apparatus and the data receiving apparatus for the transmitted data.

S105: When the to-be-transmitted data packet includes the type identifier, the data sending apparatus directly transmits the to-be-transmitted data packet to the data receiving apparatus.

Optionally, after encoding the to-be-transmitted data packet, the data sending apparatus transmits the encoded data packet to the data receiving apparatus. In this way, the bit error rate may be reduced when the data packet is transmitted on the link.

Optionally, if the link between the data sending apparatus and the data receiving apparatus has the structural requirement for the transmitted data flow, the data sending apparatus further encapsulates the encoded data packet, to meet the structural requirement of the link between the data sending apparatus and the data receiving apparatus for the transmitted data.

It should be understood that, in this embodiment of this application, the video data packet is transmitted only in the line active region, and the auxiliary data packet may be transmitted in the line active region or in the blanking interval.

S106: The data receiving apparatus determines that an identifier in a received data packet is the encryption identifier or the type identifier.

In the line active region, the data receiving apparatus may receive at least one video data packet sent by the data sending apparatus, or receive at least one video data packet and at least one auxiliary data packet sent by the data sending apparatus. In the blanking interval, the data receiving apparatus may receive at least one auxiliary data packet sent by the data sending apparatus.

In this way, based on the received data packet, the data receiving apparatus may determine whether the identifier in the data packet is the encryption identifier or the type identifier.

It should be understood that, if the data sending apparatus encodes and encapsulates the data packet before sending the data packet, the plurality of data packets received by the data receiving apparatus described above are data packets obtained after the data receiving apparatus decapsulates and decodes the data flow received from the data sending apparatus. The encoding corresponds to the decoding, and the encapsulation corresponds to the decapsulation. Details are not described again.

If the data packet received by the data receiving apparatus includes the encryption identifier, step S107 is performed. If the data packet received by the data receiving apparatus includes the type identifier, step S108 is performed.

S107: If the received data packet includes the encryption identifier, the data receiving apparatus decrypts the received data packet, and buffers, based on the data type indicated by the encryption identifier, the data packet in the buffer corresponding to the data type.

It should be understood that a mode in which the data receiving apparatus decrypts the data packet is corresponding to the encryption mode in which the data sending apparatus encrypts the data packet in step S104.

In this way, after decrypting the received encrypted data packet, the data receiving apparatus buffers, based on the data type indicated by the encryption identifier in the data packet, the data packet in the buffer corresponding to the data type.

For example, if the encryption identifier indicates that the data in the data packet is the video data, the data receiving apparatus decrypts the video data packet including the video data, and then buffers the video data packet in the video data buffer.

For another example, if the encryption identifier indicates that the data in the data packet is the audio data, the data receiving apparatus decrypts the audio data packet including the audio data, and buffers the audio data packet in the audio data buffer. Details are not described again.

S108: If the received data packet includes the type identifier, the data receiving apparatus buffers, based on the data type indicated by the type identifier in the received data packet, the data packet in the buffer corresponding to the data type.

For descriptions that the data receiving apparatus buffers, based on the data type indicated by the type identifier in the received data packet, the data packet in the buffer corresponding to the data type, references may be made to the descriptions of a process in which the data receiving apparatus buffers the data packet based on the data type indicated by the encryption identifier in the data packet in step S107. Details are not described herein again.

By using the data transmission encryption control method provided in this embodiment of this application, the encryption identifier is inserted into the data packet corresponding to the video data or the auxiliary data that needs to be encrypted, so that the video data or the auxiliary data that needs to be encrypted can be transmitted in the encrypted transmission mode, and the video data and the auxiliary data that do not need to be encrypted may be transmitted in the transparent transmission mode. In this way, by using the method provided in this embodiment of this application, the data transmission apparatus is prevented from performing an unnecessary encryption operation, thereby reducing system power consumption of the data transmission apparatus. The video data packet is the video data packet obtained based on one line of video data in the to-be-transmitted video, and the auxiliary data packet is the auxiliary data packet obtained based on the auxiliary data in the to-be-transmitted video.

In addition, by using the method provided in this embodiment of this application, data of specified video content or specified auxiliary data can be encrypted for transmission, thereby improving user experience.

To further understand beneficial effect brought by the method provided in this embodiment of this application, the following describes, by using specific examples, the beneficial effect brought by the method provided in this embodiment of this application.

For example, for a video transmitted by using a media interface, encryption protection is required for audio data, and the encryption protection cannot be performed for data (for example, video data and control data) other than the audio data. In this case, a data sending apparatus may insert an encryption identifier (for example, an encryption identifier represented by using an audio data protection start identifier and an audio data protection end identifier, or an encryption identifier represented by using an auxiliary data protection start identifier, an audio data type identifier, and an auxiliary data protection end identifier) into each audio data packet obtained based on audio data of a to-be-transmitted video. This is not limited in this application.

In addition, the data sending apparatus may insert a type identifier (for example, a type identifier represented by using an active video start identifier and an active video end identifier) into each video data packet obtained based on video data of the to-be-transmitted video. In addition, the data sending apparatus may insert a type identifier (for example, a type identifier represented by using a control data start identifier and a control data end identifier, or a type identifier represented by using an auxiliary data start identifier, a control data type identifier, and an auxiliary data end identifier) into each control data packet obtained based on control data (for example, audio rendering data and video rendering data) of the to-be-transmitted video. This is not limited in this application.

Then, when transmitting the data packets to a data receiving apparatus one by one based on a scheduling rule, the data sending apparatus may encrypt the data packet based on the encryption identifier in the to-be-transmitted data packet and then transmit the data packet, and directly transmit the data packet based on the type identifier in the to-be-transmitted data packet.

Figure 11:
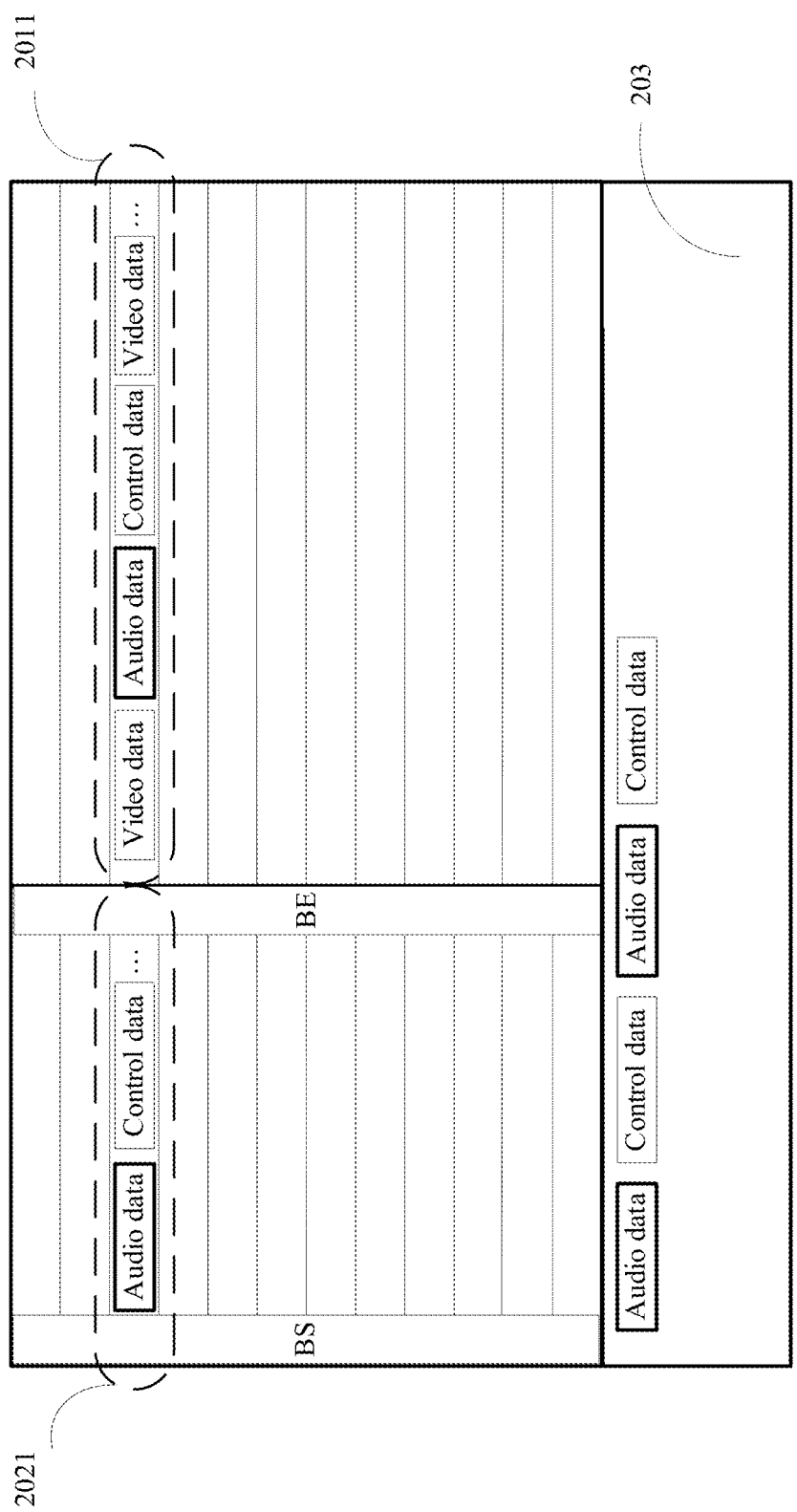
FIG. 11 is a schematic diagram of beneficial effect according to an embodiment of this application.

In this case, with reference to FIG. 2, FIG. 11 is a schematic diagram of beneficial effect of the method according to the embodiment of this application.

When the scheduling rule is a round robin rule, as shown in FIG. 11, in a line blanking interval 2021, an audio data packet and a control data packet are transmitted in a round robin mode. The audio data packet includes the encryption identifier, so that the data sending apparatus first encrypts the audio data packet and then transmits the audio data packet. The control data packet includes the type identifier, so that the data sending apparatus directly transmits the control data packet without encrypting the control data packet.

In the line active region 2011, the video data packet, the audio data packet, and the control data packet are transmitted in the round robin mode. The audio data packet includes the encryption identifier, so that the data sending apparatus first encrypts the audio data packet and then transmits the audio data packet. Both the video data packet and the control data packet include the type identifier, so that the data sending apparatus directly transmits the video data packet and the control data packet without encrypting them.

In a field blanking interval 203, the audio data packet and the control data packet are transmitted in the round robin mode. The audio data packet includes the encryption identifier, so that the data sending apparatus first encrypts the audio data packet and then transmits the audio data packet. The control data packet includes the type identifier, so that the data sending apparatus directly transmits the control data packet without encrypting the control data packet.

In this way, after receiving the audio data packet including the encryption identifier, the data receiving apparatus decrypts the audio data packet and stores the decrypted audio data packet in an audio buffer to wait for playing, directly stores the received video data packet in a video buffer to wait for playing, and directly stores the received control data packet in a control data buffer to wait for invoking.

In this manner, the method provided in this embodiment of this application may accurately implement encrypted transmission of specified data (such as the audio data), and unencrypted transmission of specified data (such as the control data). In this way, the embodiment of this application may avoid the following problem: When the control data is encrypted for transmission due to an excessively large encryption granularity, if a data decryption exception occurs on the data receive end (for example, an error occurs when the control data is decrypted due to an exception in a transmission process), the control data with the decryption exception cannot be rendered, thereby affecting user experience. In other words, user experience may be improved by using the method provided in this embodiment of this application.

In addition, compared with system power consumption caused by an encryption operation when the encrypted transmission is performed on data that does not need content protection due to the excessively large encryption granularity, the method provided in this embodiment of this application may prevent the encrypted transmission from being performed on the data that does not need content protection, thereby avoiding an unnecessary encryption operation and reducing system power consumption.

For another example, according to the embodiment of this application, video data corresponding to an image in a preset region in a first image frame of the to-be-transmitted video may be encrypted for transmission, and video data corresponding to an image outside the preset region in the first image frame is not encrypted for transmission. The first image frame is any image frame of the to-be-transmitted video.

For example, when the first image frame obtained after the video data of the to-be-transmitted video is rendered is a picture-in-picture image display effect, and a region in which a "picture-in-picture" part in the first image frame is located is used as the preset region, the data sending apparatus may, by using the method provided in this embodiment of this application, encrypt and transmit video data corresponding to an image in the region in which the "picture-in-picture" part in the first image frame is located, and video data corresponding to an image (which can be understood as a background image) outside the region in which the "picture-in-picture" part is located in the first image frame is not encrypted for transmission.

In this case, when determining the video data packet based on the video data of the to-be-transmitted video, the data sending apparatus may split each line of video data based on a pixel location of the region in which the "picture in picture" part is located, so that each line of video data in the region in which the "picture in picture" part is located may be split into m (m is a positive integer) video data packets.

In this way, the data sending apparatus may insert the encryption identifier (for example, the encryption identifier represented by using the active video protection start identifier and the active video protection end identifier) into each video data packet corresponding to the region in which the "picture in picture" part is located. In addition, the data sending apparatus may insert the type identifier (for example, the type identifier represented by using the active video start identifier and the active video end identifier) into each video data packet corresponding to the image outside the region in which the "picture in picture" part is located.

Figure 12:
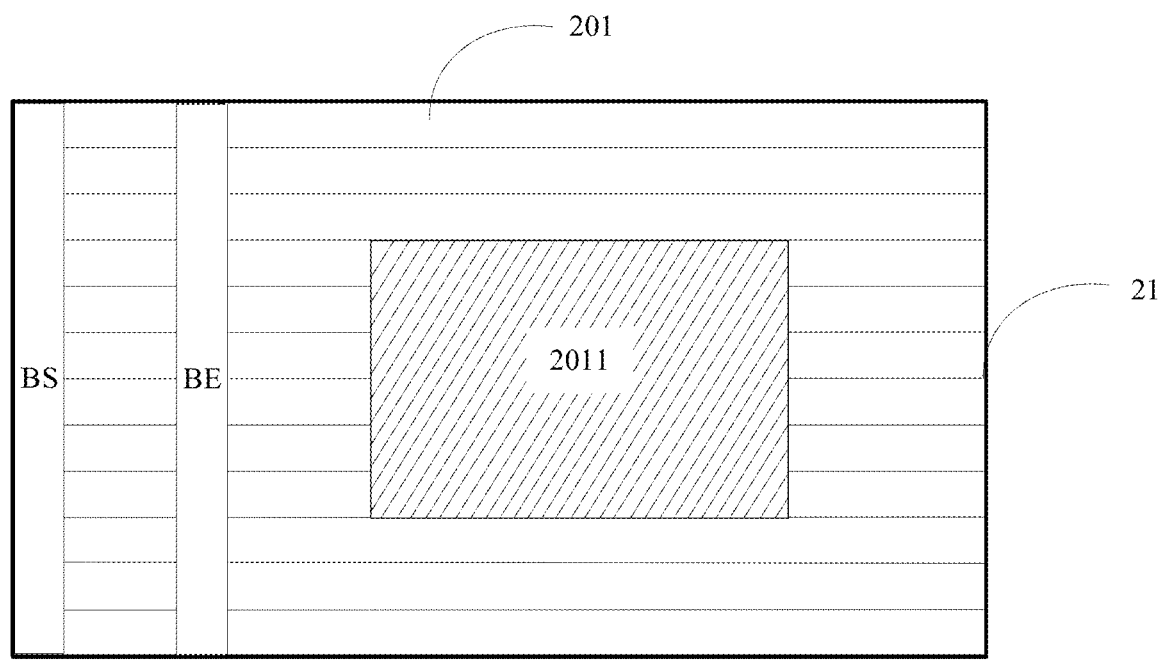
FIG. 12 is a schematic diagram of other beneficial effect according to an embodiment of this application.

In this case, with reference to FIG. 2, FIG. 12 is a schematic diagram of beneficial effect of another method according to the embodiment of this application.

As shown in FIG. 12, in an image frame 21, all video data packets corresponding to an image in a region 2011 in which the "picture-in-picture" part is located include the encrypted identifiers. In this way, when transmitting these video data packets, the data sending apparatus may first encrypt the video data packets based on the encryption identifiers in the video data packets, and then transmit the video data packets.

In an active region 201, all video data packets corresponding to an image located outside the region 2011 in which the "picture in picture" part is located include the type identifiers. In this way, when transmitting these video data packets, the data sending apparatus may directly transmit, in other words, transparently transmit, these video data packets based on the type identifiers in these video data packets.

In this manner, according to the embodiment of this application, video data corresponding to an image in an interested region (corresponding to the preset region) in an image frame of the to-be-transmitted video can be encrypted for transmission, and video data corresponding to an image outside the interested region (corresponding to the region outside the preset region) in the image frame of the to-be-transmitted video can be transparently transmitted. In this way, flexibility of data encrypted transmission is improved, so that data that requires content protection is encrypted for transmission and data that does not require to be encrypted is not encrypted for transmission, thereby improving user experience.

In addition, compared with system power consumption caused by the encryption operation when the encrypted transmission is performed on data that does not need content protection due to the excessively large encryption granularity, the method provided in this embodiment of this application may prevent the encrypted transmission from being performed on the data that does not need content protection, thereby avoiding the unnecessary encryption operation and reducing system power consumption.

The foregoing mainly describes the solutions provided in this embodiment of this application from a perspective of a method. To implement the foregoing functions, corresponding hardware structures and/or software modules for performing the functions are included. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the data transmission encryption control apparatus may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 13:
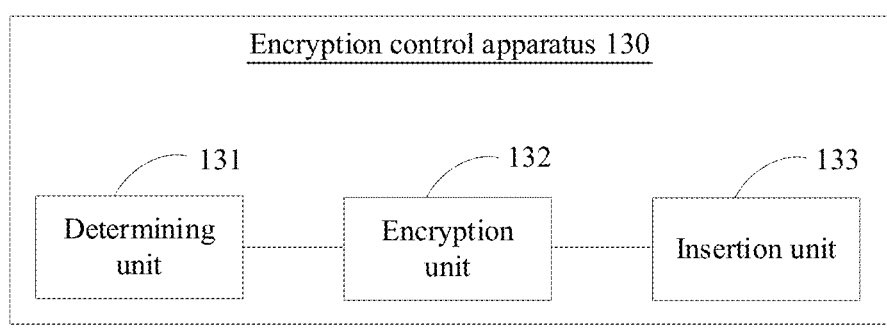
FIG. 13 is a schematic diagram of a structure of an encryption control apparatus according to an embodiment of this application.

FIG. 13 is a schematic diagram of a structure of an encryption control apparatus 130 according to the embodiment of this application. The encryption control apparatus 130 may be used in a data sending apparatus, and performs encryption control on the transmitted data in a process in which the data sending apparatus transmits data. For example, the encryption control apparatus 130 is configured to perform a method of an encryption control part in the method shown in FIG. 6. The encryption control apparatus 130 may include a determining unit 131 and an encryption unit 132.

The determining unit 131 is configured to determine that a to-be-transmitted data packet includes an encryption identifier indicating that the to-be-transmitted data packet is transmitted in an encrypted transmission mode. The encryption unit 132 is configured to encrypt the to-be-transmitted data packet. The to-be-transmitted data packet includes a video data packet obtained based on a first line of video data. The first line of video data is any line of video data in image frame data of the to-be-transmitted video.

For example, with reference to FIG. 7, the determining unit 131 may be configured to perform step S103, and the encryption unit 132 may be configured to perform step S104.

Optionally, the to-be-transmitted data packet further includes an auxiliary data packet obtained based on auxiliary data of the to-be-transmitted video, and the auxiliary data is data other than image frame data in the to-be-transmitted video.

Optionally, the foregoing encryption identifier further indicates a data type of data in the to-be-transmitted data packet, and the data type includes the image frame data and the auxiliary data.

Optionally, the encryption control apparatus 130 further includes an insertion unit 133, configured to: insert the encryption identifier or a type identifier into the to-be-transmitted data packet based on data content in the to-be-transmitted data packet before it is determined that the to-be-transmitted data packet includes the encryption identifier, and insert the encryption identifier into the to-transmitted data packet when it is determined that the data in the to-be-transmitted data packet is data that needs to be encrypted. The type identifier indicates the data type of the data in the to-be-transmitted data packet. The data type includes the image frame data and the auxiliary data.

For example, with reference to FIG. 7, the insertion unit 133 may be configured to perform step S104 or S105.

Optionally, the auxiliary data includes content data, and the content data includes at least one of audio data, subtitle data, bullet comment data, or logo data. The insertion unit 133 is specifically configured to insert the encryption identifier into the to-be-transmitted data packet if the data in the to-be-transmitted data packet is the content data.

For example, with reference to FIG. 7, the insertion unit 133 may be configured to perform step S104.

Optionally, the auxiliary data further includes control data. The control data includes at least one of audio rendering data, image frame rendering data in the to-be-transmitted video, remote control data, or special effect data. The remote control data is used to remotely operate the image frame. The insertion unit 133 is further specifically configured to insert the type identifier into the to-be-transmitted data packet if the data in the to-be-transmitted data packet is the control data. The type identifier indicates that the data in the to-be-transmitted data packet is the control data.

For example, with reference to FIG. 7, the insertion unit 133 may be configured to perform step S105.

Optionally, the insertion unit 133 is further specifically configured to insert the encryption identifier into the to-be-transmitted data packet if the data in the to-be-transmitted data packet corresponds to an image in a preset region in a first image frame. The first image frame is any image frame of the to-be-transmitted video.

Optionally, the insertion unit 133 is further specifically configured to insert the type identifier into the to-be-transmitted data packet if the data in the to-be-transmitted data packet corresponds to an image outside the preset region in the first image frame. The type identifier indicates that the data in the to-be-transmitted data packet is video data.

For specific descriptions of the foregoing optional manners, refer to the foregoing method embodiments. Details are not described herein again. In addition, for explanations of any encryption control apparatus 130 provided above and descriptions of beneficial effect, refer to the foregoing corresponding method embodiments. Details are not described again.

For example, with reference to FIG. 3, functions implemented by the determining unit 131, the encryption unit 132, and the insertion unit 133 in the data transmission apparatus 130 may be implemented by the processor 31 in FIG. 3 by executing the program code in the memory 32 in FIG. 3.

Figure 14:
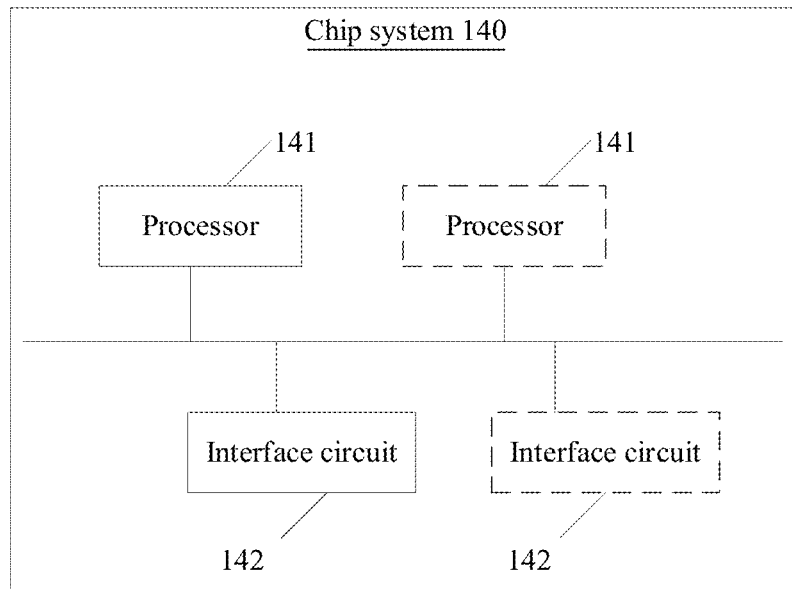
FIG. 14 is a schematic diagram of a structure of a chip system according to an embodiment of this application.

An embodiment of this application further provides a chip system 140. As shown in FIG. 14, the chip system 140 includes at least one processor and at least one interface circuit. For example, when the chip system 140 includes one processor and one interface circuit, the processor may be a processor 141 shown in a solid-line box (or a processor 141 shown in a dashed-line box) in FIG. 14, and the interface circuit may be an interface circuit 142 shown in a solid-line box (or an interface circuit 142 shown in a dashed-line box) in FIG. 14. When the chip system 140 includes two processors and two interface circuits, the two processors include the processor 141 shown in the solid-line box and the processor 141 shown in the dashed-line box in FIG. 14, and the two interface circuits include the interface circuit 142 shown in the solid-line box and the interface circuit 142 shown in the dashed-line box in FIG. 14. This is not limited.

The processor 141 and the interface circuit 142 may be interconnected through a line. For example, the interface circuit 142 may be configured to receive a signal (for example, obtain source data of a to-be-transmitted video). For another example, the interface circuit 142 may be configured to send a signal to another apparatus (for example, the processor 141). For example, the interface circuit 142 may read instructions stored in the memory, and send the instructions to the processor 141. When the instructions are executed by the processor 141, the encryption control apparatus may be enabled to perform the steps in the foregoing embodiments. Certainly, the chip system 140 may further include another discrete component. This is not specifically limited in this embodiment of this application.

Figure 15:
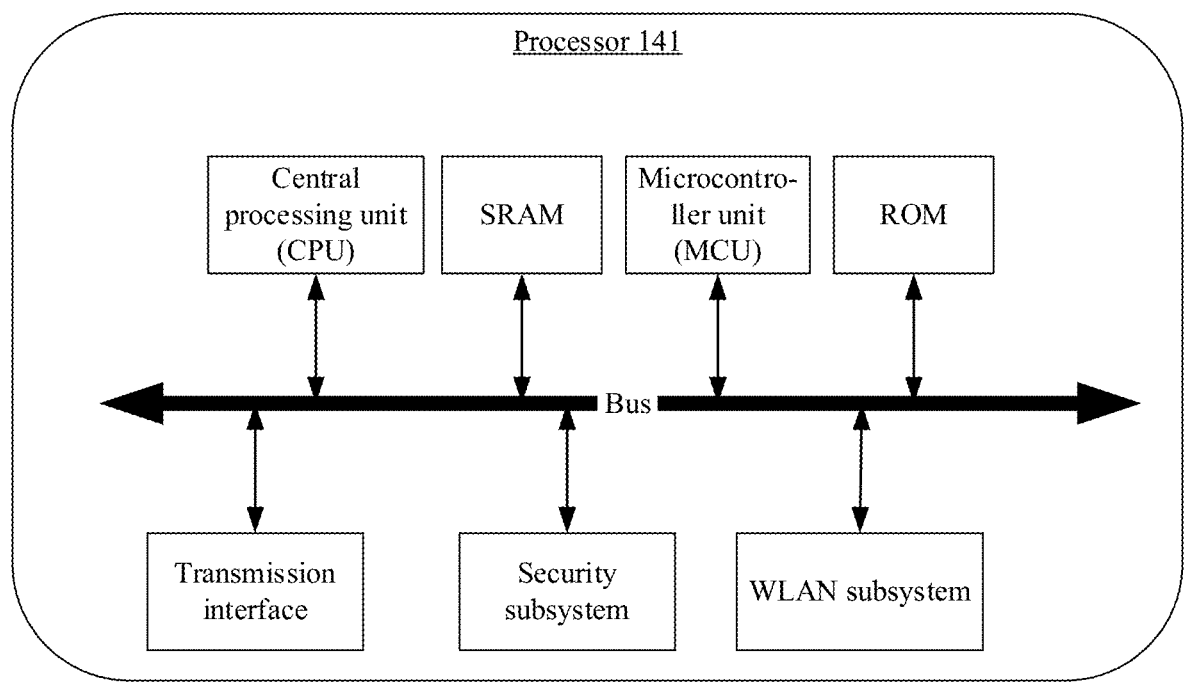
FIG. 15 is a diagram of a hardware architecture of a processor according to an embodiment of this application.

FIG. 15 is a diagram of a hardware architecture of the processor 141.

As shown in FIG. 15, the processor 141 includes at least one CPU and a memory. A type of the memory may include, for example, an SRAM, a ROM, a microcontroller unit (MCU), a security subsystem, a WLAN subsystem, a bus, and a transmission interface. Although not shown in FIG. 14, the chip system 140 may further include other dedicated processors such as an application processor (AP) and an NPU, and other subsystems such as a power management subsystem, a clock management subsystem, and a power consumption management subsystem.

The foregoing parts of the chip system 140 are coupled by using a connector. For example, the connector includes various interfaces, transmission lines, buses, or the like. These interfaces are usually electrical communication interfaces, or may be mechanical interfaces or interfaces in other forms. This is not limited in this embodiment.

Optionally, the CPU may be a single-core processor (single-CPU) or a multi-core processor (multi-CPU). Optionally, the CPU may be a processor group including a plurality of processors, and the plurality of processors are coupled to each other through one or more buses. In an optional case, the CPU implements any wireless screen projection method in the foregoing method embodiments by invoking program instructions stored in an on-chip memory or an off-chip memory. In an optional case, the CPU and the MCU jointly implement any wireless screen projection method in the foregoing method embodiments. For example, the CPU completes some steps in the wireless screen projection method, and the MCU completes other steps in the wireless screen projection method. In an optional case, the AP or another dedicated processor invokes the program instructions stored in the on-chip memory or the off-chip memory to implement any wireless screen projection method in the foregoing method embodiments.

The transmission interface may be an interface for receiving and sending data of the processor chip. The transmission interface usually includes a plurality of interfaces. In an optional case, the transmission interface may include an inter-integrated circuit (I2C) interface, a serial peripheral interface (SPI), a universal asynchronous receiver-transmitter (UART) interface, a general-purpose input/output (GPIO) interface, and the like. It should be understood that these interfaces may implement different functions by reusing a same physical interface.

In an optional case, the transmission interface may further include a high-definition multimedia interface (HDMI), a V-By-One interface, an embedded DisplayPort (Embedded DisplayPort, eDP), a mobile industry processor interface (Mobile Industry Processor Interface, MIPI), a DisplayPort (DP), or the like.

In an optional case, the foregoing parts are integrated into a same chip. In another optional case, the memory may be an independent chip.

The security subsystem may be configured to implement an encryption algorithm related to security authentication. It should be understood that the encryption algorithm related to the security authentication is usually implemented by hardware, to further improve security of the encryption algorithm.

The WLAN subsystem may include, for example, an RF circuit and a baseband.

Another embodiment of this application further provides a computer-readable storage medium. The computer-readable storage medium stores instructions. When the instructions are run on an encryption control apparatus, the encryption control apparatus performs the steps performed by the encryption control apparatus in the method procedure shown in the foregoing method embodiment.

In some embodiments, the disclosed method may be implemented as computer program instructions encoded in a machine-readable format on a computer-readable storage medium or on another non-transitory medium or product.

Figure 16:
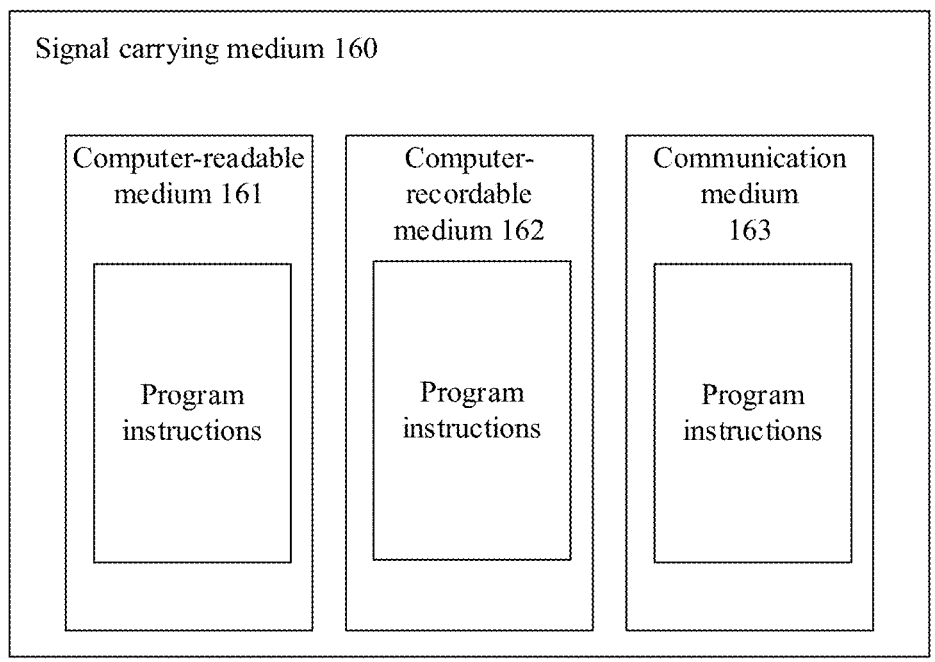
FIG. 16 is a schematic diagram of a structure of a signal carrying medium configured to carry a computer program product according to an embodiment of this application.

FIG. 16 is a schematic diagram of a structure of a signal carrying medium configured to carry a computer program product according to the embodiment of this application. The signal carrying medium is configured to store the computer program product or a computer program for executing a computer process on a computing device.

As shown in FIG. 16, the signal carrying medium 160 may include one or more program instructions. When the one or more program instructions are executed by one or more processors, the encryption control function or some functions described in FIG. 6 may be provided. Therefore, for example, one or more features described with reference to steps S101 to S105 in FIG. 6 may be carried by one or more instructions associated with the signal carrying medium 160. In addition, the program instructions in FIG. 16 also describe example instructions.

In some examples, the signal carrying medium 160 may include a computer-readable medium 161, for example, but not limited to, a hard disk drive, a compact disc (CD), a digital video disc (DVD), a digital tape, a memory, a read-only memory (ROM), or a random access memory (RAM).

In some implementations, the signal carrying medium 160 may include a computer-recordable medium 162, for example, but not limited to, a memory, a read/write (R/W) CD, or an R/W DVD.

In some implementations, the signal carrying medium 160 may include a communication medium 163, for example, but not limited to, a digital and/or an analog communication medium (for example, an optical fiber cable, a waveguide, a wired communication link, or a wireless communication link).

The signal carrying medium 160 may be conveyed by a communication medium 163 in a wireless form (for example, a wireless communication medium that complies with the IEEE 1902.11 standard or another transmission protocol). The one or more program instructions may be, for example, one or more computer-executable instructions or logic implementation instructions.

In some examples, for example, the encryption control apparatus described in FIG. 6 may be configured to provide various operations, functions, or actions in response to one or more program instructions in the computer-readable medium 161, the computer-recordable medium 162, and/or the communication medium 163.

It should be understood that an arrangement described herein is merely used as an example. Therefore, a person skilled in the art should understand that another arrangement and another element (for example, a machine, an interface, a function, a sequence, and a function group) can be used to replace the arrangement, and some elements may be omitted depending on a desired result. In addition, many of the described elements are functional entities that can be implemented as discrete or distributed components, or implemented in any suitable combination at any suitable location in combination with another component.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When computer-executable instructions are executed on a computer, procedures or functions according to embodiments of this application are all or partially generated. The computer may be a general-purpose computer, a dedicated computer, a computer network, or another programmable apparatus. The computer instructions may be stored in the computer-readable storage medium or may be transmitted from the computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as the server or the data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
    splitting data of a to-be-transmitted video into a plurality of to-be-transmitted data packets, comprising:
        when the data is data of an image frame of the to-be-transmitted video, splitting the data of the image frame into a plurality of video data packets; and
        when the data is auxiliary data of the to-be-transmitted video, splitting the auxiliary data into a plurality of auxiliary data packets, wherein the auxiliary data is data other than image frame data in the to-be-transmitted video;
    for each to-be-transmitted data packet of the plurality of to-be-transmitted data packets, inserting an identifier into the to-be-transmitted data packet based on data content in the to-be-transmitted data packet, wherein when the data content in the to-be-transmitted data packet corresponds to encryption the identifier is an encryption identifier, and when the data content does not correspond to encryption the identifier is a type identifier indicating a data type of the data content in the to-be-transmitted data packet; and
    for each to-be-transmitted data packet of the plurality of to-be-transmitted data packets, encrypting the to-be-transmitted data packet when the to-be-transmitted data packet comprises the encryption identifier.

2. The method according to claim 1, wherein the encryption identifier further indicates a data type of the data content in the to-be-transmitted data packet, and the data type comprises image frame data type or auxiliary data type.

3. The method according to claim 1, wherein the auxiliary data comprises content data, and the content data comprises at least one of audio data, subtitle data, bullet comment data, or logo data; and
    wherein inserting the identifier into the to-be-transmitted data packet based on the data content in the to-be-transmitted data packet comprises:
        inserting the encryption identifier into the to-be-transmitted data packet when the data content in the to-be-transmitted data packet is the content data.

4. The method according to claim 1, wherein the auxiliary data comprises control data, the control data comprises at least one of audio rendering data, image frame rendering data in the to-be-transmitted video, remote control data, or special effect data, and the remote control data is configured to be used to remotely operate the image frame; and
    wherein inserting the identifier into the to-be-transmitted data packet based on the data content in the to-be-transmitted data packet comprises:
        inserting the type identifier into the to-be-transmitted data packet when the data content in the to-be-transmitted data packet is the control data, wherein the type identifier indicates that the data content in the to-be-transmitted data packet is the control data.

5. The method according to claim 1, wherein inserting the identifier into the to-be-transmitted data packet based on the data content in the to-be-transmitted data packet comprises:
    inserting the encryption identifier into the to-be-transmitted data packet when the data content in the to-be-transmitted data packet corresponds to an image in a preset region in a first image frame, wherein the first image frame is any image frame of the to-be-transmitted video.

6. The method according to claim 5, wherein inserting the identifier into the to-be-transmitted data packet based on the data content in the to-be-transmitted data packet comprises:
    inserting the type identifier into the to-be-transmitted data packet when the data content in the to-be-transmitted data packet corresponds to an image outside the preset region in the first image frame, wherein the type identifier indicates that the data content in the to-be-transmitted data packet is video data.

7. An apparatus, comprising:
    at least one processor; and
    a non-transitory computer readable storage medium storing instructions that are executable by the at least one processor, wherein execution of the instructions enables the apparatus to:
        split data of a to-be-transmitted video into a plurality of to-be-transmitted data packets, comprising:
            when the data is data of an image frame of the to-be-transmitted video, splitting the data of the image frame into a plurality of video data packets; and
            when the data is auxiliary data of the to-be-transmitted video, splitting the auxiliary data into a plurality of auxiliary data packets, wherein the auxiliary data is data other than image frame data in the to-be-transmitted video;
        for each to-be-transmitted data packet of the plurality of to-be-transmitted data packets, insert an identifier into the to-be-transmitted data packet based on data content in the to-be-transmitted data packet, wherein when the data content in the to-be-transmitted data packet corresponds to encryption the identifier is an encryption identifier, and when the data content does not correspond to encryption the identifier is a type identifier indicating a data type of the data content in the to-be-transmitted data packet; and
        for each to-be-transmitted data packet of the plurality of to-be-transmitted data packets, encrypt the to-be-transmitted data packet when the to-be-transmitted data packet comprises the encryption identifier.

8. The apparatus according to claim 7, wherein the encryption identifier further indicates a data type of the data content in the to-be-transmitted data packet, and the data type comprises an image frame data type or an auxiliary data type.

9. The apparatus according to claim 7, wherein the auxiliary data comprises content data, and the content data comprises at least one of audio data, subtitle data, bullet comment data, or logo data; and
    inserting the identifier into the to-be-transmitted data packet based on the data content in the to-be-transmitted data packet comprises:

inserting the encryption identifier into the to-be-transmitted data packet when the data content in the to-be-transmitted data packet is the content data.

10. The apparatus according to claim 7, wherein the auxiliary data further comprises control data, the control data comprises at least one of audio rendering data, image frame rendering data in the to-be-transmitted video, remote control data, or special effect data, and the remote control data is configured to be used to remotely operate the image frame; and inserting the identifier into the to-be-transmitted data packet based on the data content in the to-be-transmitted data packet comprises:
inserting the type identifier into the to-be-transmitted data packet when the data content in the to-be-transmitted data packet is the control data, wherein the type identifier indicates that the data content in the to-be-transmitted data packet is the control data.

11. The apparatus according to claim 7, wherein inserting the identifier into the to-be-transmitted data packet based on the data content in the to-be-transmitted data packet comprises:
inserting the encryption identifier into the to-be-transmitted data packet when the data content in the to-be-transmitted data packet corresponds to an image in a preset region in a first image frame, wherein the first image frame is any image frame of the to-be-transmitted video.

12. A non-transitory computer readable storage medium storing instructions that are executable by at least one processor, wherein when the instructions are executed an apparatus is enabled to:
split data of a to-be-transmitted video into a plurality of to-be-transmitted data packets, comprising:
when the data is data of an image frame of the to-be-transmitted video, splitting the data of the image frame into a plurality of video data packets; and
when the data is auxiliary data of the to-be-transmitted video, splitting the auxiliary data into a plurality of auxiliary data packets, wherein the auxiliary data is data other than image frame data in the to-be-transmitted video;
for each to-be-transmitted data packet of the plurality of to-be-transmitted data packets, insert an identifier into the to-be-transmitted data packet based on data content in the to-be-transmitted data packet, wherein when the data content in the to-be-transmitted data packet corresponds to encryption the identifier is an encryption identifier, and when the data content does not correspond to encryption the identifier is a type identifier indicating a data type of the data content in the to-be-transmitted data packet;
and
for each to-be-transmitted data packet of the plurality of to-be-transmitted data packets, encrypt the to-be-transmitted data packet when the to-be-transmitted data packet comprises the encryption identifier.

13. The non-transitory computer readable storage medium according to claim 12, wherein the encryption identifier further indicates a data type of the data content in the to-be-transmitted data packet, and the data type comprises an image frame data type or an auxiliary data type.

14. The non-transitory computer readable storage medium according to claim 12, wherein the auxiliary data comprises content data, and the content data comprises at least one of audio data, subtitle data, bullet comment data, or logo data; and
wherein inserting the identifier into the to-be-transmitted data packet based on the data content in the to-be-transmitted data packet comprises:
inserting the encryption identifier into the to-be-transmitted data packet when the data content in the to-be-transmitted data packet is the content data.

15. The non-transitory computer readable storage medium according to claim 12, wherein the auxiliary data comprises control data, the control data comprises at least one of audio rendering data, image frame rendering data in the to-be-transmitted video, remote control data, or special effect data, and the remote control data is configured to be used to remotely operate the image frame; and
wherein inserting the identifier into the to-be-transmitted data packet based on the data content in the to-be-transmitted data packet comprises:
inserting the type identifier into the to-be-transmitted data packet when the data content in the to-be-transmitted data packet is the control data, wherein the type identifier indicates that the data content in the to-be-transmitted data packet is the control data.

16. The non-transitory computer readable storage medium according to claim 12, wherein inserting the identifier into the to-be-transmitted data packet based on the data content in the to-be-transmitted data packet comprises:
inserting the encryption identifier into the to-be-transmitted data packet when the data content in the to-be-transmitted data packet corresponds to an image in a preset region in a first image frame, wherein the first image frame is any image frame of the to-be-transmitted video.

17. The non-transitory computer readable storage medium according to claim 12, wherein inserting the identifier into the to-be-transmitted data packet based on the data content in the to-be-transmitted data packet comprises:
inserting the type identifier into the to-be-transmitted data packet when the data content in the to-be-transmitted data packet corresponds to an image outside a preset region in the image frame, wherein the type identifier indicates that the data content in the to-be-transmitted data packet is video data.

18. The method according to claim 1, wherein the encryption identifier comprises an encryption start identifier and an encryption end identifier.

19. The apparatus according to claim 7, wherein the encryption identifier comprises an encryption start identifier and an encryption end identifier.

20. The non-transitory computer readable storage medium according to claim 12, wherein the encryption identifier comprises an encryption start identifier and an encryption end identifier.

* * * * *